US012568277B2

(12) United States Patent
Maystre et al.

(10) Patent No.: US 12,568,277 B2
(45) Date of Patent: Mar. 3, 2026

(54) OPTIMIZING SELECTION OF MEDIA CONTENT FOR LONG-TERM OUTCOMES

(71) Applicant: Spotify AB, Stockholm (SE)

(72) Inventors: Lucas Maystre, London (GB); Thomas Baldwin-McDonald, Sheffield (GB); Mounia Lalmas-Roelleke, London (GB); Daniel Russo, New York, NY (US); Kamil Andrzej Ciosek, Luton (GB); Tiffany Wu, New York, NY (US); Germain Tanguy, Anglet (FR)

(73) Assignee: Spotify AB, Stockholm (SE)

( * ) Notice: Subject to any disclaimer, the term of this patent is extended or adjusted under 35 U.S.C. 154(b) by 74 days.

(21) Appl. No.: 18/627,301

(22) Filed: Apr. 4, 2024

(65) Prior Publication Data

US 2025/0317622 A1 Oct. 9, 2025

(51) Int. Cl.
*H04N 21/466* (2011.01)
*G06Q 30/0242* (2023.01)
(Continued)

(52) U.S. Cl.
CPC ..... *H04N 21/4662* (2013.01); *G06Q 30/0242* (2013.01); *G06Q 30/0243* (2013.01); *G06Q 30/0244* (2013.01); *G06Q 30/0246* (2013.01); *H04N 21/44204* (2013.01); *H04N 21/4826* (2013.01)

(58) Field of Classification Search
CPC ......... H04N 21/4662; H04N 21/44204; H04N 21/4826; G06Q 30/0242–0244; G06Q 30/0246
See application file for complete search history.

(56) References Cited

U.S. PATENT DOCUMENTS

| | | | |
|---|---|---|---|
| 9,996,851 B1 * | 6/2018 | Hummel | G06Q 30/0242 |
| 12,342,043 B1 * | 6/2025 | Kini | H04N 21/4666 |

(Continued)

FOREIGN PATENT DOCUMENTS

WO 2022/115356 A1 6/2022

OTHER PUBLICATIONS

Agrawal, Shipra and Navin Goyal. 2012. Analysis of Thompson sampling for the multi-armed bandit problem. In Conference on learning theory. JMLR Workshop and Conference Proceedings, 23:39.1-39.26, 2012.

(Continued)

*Primary Examiner* — Nicholas T Corbo
(74) *Attorney, Agent, or Firm* — McDonnell Boehnen Hulbert & Berghoff LLP

(57) ABSTRACT

Systems and methods for optimizing selection of media content for long-term outcomes are provided. Observational data including intermediate outcomes from an observation period is combined with historical data to select media content based on estimated long-term outcomes at the end of an optimization period. As time passes, the observational data is updated with more intermediate outcomes, allowing more accurate estimates of long-term outcomes to be made. In an example, a predictive model trained using the historical data uses the observational data to estimate distributions of long-term outcomes. An action selector selects samples from the distributions and selects media content based on the samples.

20 Claims, 12 Drawing Sheets

(51) Int. Cl.
 *H04N 21/442* (2011.01)
 *H04N 21/482* (2011.01)

(56) References Cited

U.S. PATENT DOCUMENTS

| | | | | | |
|---|---|---|---|---|---|
| 2017/0236148 | A1* | 8/2017 | James | .................... | G06F 16/335 |
| | | | | | 705/14.45 |
| 2019/0213476 | A1* | 7/2019 | Singh | ........................ | G06N 3/08 |
| 2020/0322307 | A1* | 10/2020 | Zhang | ................ | G06Q 30/0242 |
| 2023/0113072 | A1 | 4/2023 | Labbe | | |
| 2024/0161150 | A1* | 5/2024 | Chung | ................ | G06Q 30/0244 |

OTHER PUBLICATIONS

Athey, Susan, Raj Chetty, Guido W Imbens, and Hyunseung Kang. 2019. The surrogate index: Combining short-term proxies to estimate long-term treatment effects more rapidly and precisely. Technical Report. National Bureau of Economic Research.

Aziz, Maryam, Jesse Anderton, Kevin Jamieson, Alice Wang, Hugues Bouchard, and Javed Aslam. 2022. Identifying New Podcasts with High General Appeal Using a Pure Exploration Infinitely-Armed Bandit Strategy. In Proceedings of the 16th ACM Conference on Recommender Systems. 134-144.

Bastani, Hamsa, David Simchi-Levi, and Ruihao Zhu. 2021. Meta dynamic pricing: Transfer learning across experiments. arXiv:1902. 10918v4 [cs.LG] Jan. 6, 2021.

Basu, Soumya, Branislav Kveton, Manzil Zaheer, and Csaba Szepesvári. 2021. No regrets for learning the prior in bandits. Advances in Neural Information Processing Systems 34 (2021), 28029-28041.

Bennett, James and Stan Lanning. 2007. The Netflix Prize. In Proceedings of KDDCup '07. San Jose, CA, USA.

Bogina, Veronika and Tsvi Kuflik. 2017. Incorporating Dwell Time in Session-Based Recommendations with Recurrent Neural Networks. In RecTemp@ RecSys. 57-59.

Caria, Stefano, Maximilian Kasy, Simon Quinn, Soha Shami, Alex Teytelboym, et al. 2020. An adaptive targeted field experiment: Job search assistance for refugees in Jordan. (2020).

Chapelle, Olivier and Lihong Li. 2011. An empirical evaluation of Thompson sampling. Advances in Neural Information Processing Systems 24 (2011).

Dedieu, Antoine, Rahul Mazumder, Zhen Zhu, and Hossein Vahabi. 2018. Hierarchical Modeling and Shrinkage for User Session Length Prediction in Media Streaming. In Proceedings of the 27th ACM International Conference on Information and Knowledge Management. 607-616.

Desautels, Thomas , Andreas Krause, and Joel W Burdick. 2014. Parallelizing exploration-exploitation tradeoffs in Gaussian process bandit optimization. Journal of Machine Learning Research 15 (2014), 3873-3923.

Graepel, Thore, Joaquin Quinonero Candela, Thomas Borchert, and Ralf Herbrich. 2010. Web-scale Bayesian click-through rate prediction for sponsored search advertising in Microsoft's Bing search engine. Omnipress.

Grover, Aditya, Todor Markov, Peter Attia, Norman Jin, Nicolas Perkins, Bryan Cheong, Michael Chen, Zi Yang, Stephen Harris, William Chueh, et al. 2018. Best arm identification in multi-armed bandits with delayed feedback. In International Conference on Artificial Intelligence and Statistics. PMLR, 833-842.

Hastie, Trevor, Robert Tibshirani, and Jerome Friedman. 2009. The Elements of Statistical Learning: Data Mining, Inference, and Prediction (second ed.). Springer.

Hohnhold. Henning, Deirdre O'Brien, and Diane Tang. 2015. Focusing on the Long-Term: It's Good for Users and Business. In Proceedings of the 21th ACM SIGKDD International Conference on Knowledge Discovery and Data Mining (Sydney, NSW, Australia) (KDD '15). Association for Computing Machinery, New York, NY, USA, 1849-1858. https://doi.org/10.1145/2783258.2788583.

Hong, Liangjie and Mounia Lalmas. 2019. Tutorial on online user engagement: Metrics and optimization. In Companion Proceedings of The 2019 World Wide Web Conference. 1303-1305.

Joulani, Pooria, Andras Gyorgy, and Csaba Szepesvári. 2013. Online learning under delayed feedback. In International Conference on Machine Learning. PMLR, 1453-1461.

Kandasamy, Kirthevasan, Akshay Krishnamurthy, Jeff Schneider, and Barnabás Póczos. 2018. Parallelised Bayesian optimisation via Thompson sampling. In International Conference on Artificial Intelligence and Statistics. PMLR, 133-142.

Lacoste, Alexandre, Alexandra Luccioni, Victor Schmidt, and Thomas Dandres. 2019. Quantifying the carbon emissions of machine learning. arXiv preprint arXiv: 1910.09700 (2019).

Lalmas, Mounia, Heather O'Brien, and Elad Yom-Tov. 2014. Measuring user engagement. Synthesis lectures on information concepts, retrieval, and services 6, 4 (2014), 1-132.

Li, Lisha, Kevin Jamieson, Giulia DeSalvo, Afshin Rostamizadeh, and Ameet Talwalkar. 2017. Hyperband: A novel bandit-based approach to hyperparameter optimization. The Journal of Machine Learning Research 18, 1 (2017), 6765-6816.

Li. Lihong , Wei Chu, John Langford, and Robert E Schapire. 2010. A contextual bandit approach to personalized news article recommendation. In Proceedings of the 19th International Conference on World Wide Web. 661-670.

Mattos, David Issa, Jan Bosch, and Helena Holmström Olsson. 2019. Multi-armed bandits in the wild: Pitfalls and strategies in online experiments. Information and Software Technology 113 (2019), 68-81.

McInerney, James, Benjamin Lacker, Samantha Hansen, Karl Higley, Hugues Bouchard, Alois Gruson, and Rishabh Mehrotra. 2018. Explore, Exploit, and Explain: Personalizing Explainable Recommendations with Bandits. In Proceedings of RecSys '18. Vancouver, BC, Canada.

Prentice, Ross L. 1989. Surrogate endpoints in clinical trials: definition and operational criteria. Statistics in Medicine 8, 4 (1989), 431-440.

Qin, Chao and Daniel Russo. 2022. Adaptivity and confounding in multi-armed bandit experiments. arXiv preprint arXiv:2202.09036 (2022).

Rasmussen, Carl Edward, Christopher KI Williams, et al. 2006. Gaussian processes for machine learning. Vol. 1. Springer.

Ricci, F., L. Rokach, and B. Shapira. 2015. Recommender Systems Handbook (second ed.). Springer/.

Russo, Daniel and Benjamin Van Roy. 2016. An information-theoretic analysis of Thompson sampling. The Journal of Machine Learning Research 17, 1 (2016), 2442-2471.

Russo, Daniel J., Benjamin Van Roy, Abbas Kazerouni, Ian Osband, Zheng Wen, et al. 2018. A tutorial on Thompson sampling. Foundations and Trends in Machine Learning 11, 1 (2018), 1-96.

Scott, Stephen L. 2010. A modern Bayesian look at the multi-armed bandit. Applied Stochastic Models in Business and Industry 26, 6 (2010), 639-658.

Simchowitz, Max, Christopher Tosh, Akshay Krishnamurthy, Daniel J Hsu, Thodoris Lykouris, Miro Dudik, and Robert E Schapire. 2021. Bayesian decision making under misspecified priors with applications to meta-learning. Advances in Neural Information Processing Systems 34 (2021), 26382-26394.

Slivkins, et al. 2019. Introduction to multi-armed bandits. Foundations and Trends in Machine Learning 12, 1-2 (2019), 1-286.

Srinivas, Niranjan, Andreas Krause, Sham M Kakade, and Matthias Seeger. 2009. Gaussian process optimization in the bandit setting: No regret and experimental design. arXiv preprint arXiv:0912.3995 (2009).

Thompson, William R. 1933. On the likelihood that one unknown probability exceeds another in view of the evidence of two samples. Biometrika 25, 3-4 (1933), 285-294.

Tran, Thi Ngoc Trang, Alexander Felfernig, Christoph Trattner, and Andreas Holzinger. 2021. Recommender systems in the healthcare domain: State-of-the-art and research issues. Journal of Intelligent Information Systems 57 (2021), 171-201.

Verbert, Katrien, Nikos Manouselis, Xavier Ochoa, Martin Wolpers, Hendrik Drachsler, Ivana Bosnic, and Erik Duval. 2012. Context-

(56)     References Cited

OTHER PUBLICATIONS

Aware Recommender Systems for Learning: A Survey and Future Challenges. Journal of Intelligent Information Systems 5, 4 (2012), 318-335.

Wu, Han and Stefan Wager. 2022. Partial Likelihood Thompson Sampling. arXiv preprint arXiv:2203.00820 (2022).

Wu, Han and Stefan Wager. 2022. Thompson Sampling with Unrestricted Delays. arXiv preprint arXiv:2202.12431 (2022).

Wu, Qingyun, Hongning Wang, Liangjie Hong, and Yue Shi. 2017. Returning is believing: Optimizing long-term user engagement in recommender systems. In Proceedings of the 2017 ACM on Conference on Information and Knowledge Management. 1927-1936.

Yang, Jeremy, Dean Eckles, Paramveer Dhillon, and Sinan Aral. 2020. Targeting for long-term outcomes. arXiv preprint arXiv:2010.15835 (2020).

Zhao, Xiangyu, Long Xia, Jiliang Tang, and Dawei Yin. 2019. Deep reinforcement learning for search, recommendation, and online advertising: a survey. ACM SIGWEB newsletter Spring (2019), 1-15.

Zheng, Guanjie, Fuzheng Zhang, Zihan Zheng, Yang Xiang, Nicholas Jing Yuan, Xing Xie, and Zhenhui Li. 2018. DRN: A deep reinforcement learning framework for news recommendation. In Proceedings of the 2018 World Wide Web Conference. 167-176.

Zou, Lixin, Long Xia, Zhuoye Ding, Jiaxing Song, Weidong Liu, and Dawei Yin. 2019. Reinforcement learning to optimize long-term user engagement in recommender systems. In Proceedings of the 25th ACM SIGKDD International Conference on Knowledge Discovery & Data Mining. 2810-2818.

Thomas M. McDonald et al., "Impatient bandits: optimizing recommendations for the long-term without delay", https://arxiv.org/pdf/2307.09943.pdf, Jul. 20, 2023, 11 pages.

Lucas Maystre et al., "Optimizing audio recommendations for the long-term: a reinforcement learning perspective", https://arxiv.org/pdf/2302.03561.pdf, Mar. 1, 2023, 45 pages.

Yuyan Wang et al., "Surrogate for long-term user experience in recommender systems", https://dl.acm.org/doi/pdf/10.1145/3534678.3539073, KDD '22, Aug. 14-18, 2022, Washington DC, USA, pp. 4100-4109.

* cited by examiner

102

112

114

OPTIMIZING SELECTION OF MEDIA CONTENT FOR LONG-TERM OUTCOMES

BACKGROUND

When new media content is released, there is little to no data about the media content or long-term user engagement with the media content. One solution is to wait for a long time (e.g., 2 months) to compile long-term data about user engagement. However, this is too slow to be practical. Other solutions use short-term proxies to estimate long-term user engagement, but these proxies are not necessarily well-aligned with long-term user engagement and may reflect long-term user engagement imperfectly.

SUMMARY

In general terms, this disclosure is directed to optimizing selection of media content for long-term outcomes. In some embodiments, and by non-limiting example, observational data from an observation period is combined with historical data to select media content based on estimated long-term outcomes at the end of an optimization period. As more time passes, more observational data becomes available, and better estimates of long-term outcomes can be made from which media content is selected.

In a first aspect, a method for select media content for optimal long-term outcomes is provided. Observational data for a first plurality of media programs is compiled. The observational data includes engagement data for each of the first plurality of media programs during an observation period. Historical data is compiled for a second plurality of media programs. The historical data includes engagement data for each of the second plurality of media programs during a historical engagement period. A reward model is trained using the historical data. Distributions are estimated for each of the first plurality of media programs using the reward model and the observational data. Each distribution in the distributions defines an estimated range of engagement days over an optimization period. Samples are selected from the distributions. A media program is selected from the first plurality of media programs based on the samples. A computing device presents the selected media program.

In a second aspect, a system for selecting media programs for optimal long-term outcomes is provided. The system includes one or more processors and one or more computer-readable storage devices storing data instructions. Execution of the data instructions by the one or more processors causes the system to compile observational data for a first plurality of media programs, compile historical data for a second plurality of media programs, train a predictive model using the historical data, estimate distributions for each of the first plurality of media programs using the predictive model and the observational data, select samples from the distributions, select a media program from the first plurality of media programs based on the samples, cause a computing device to present the selected media program, and update the observational data for the first plurality of media programs with updated intermediate outcomes. The observational data includes intermedia outcomes for one or more observation periods. The historical data includes intermediate outcomes and long-term outcomes from one or more historical engagement periods. Each distribution of the distributions defines an estimated range for a long-term outcome at an end of an optimization period.

In a third aspect, a non-transitory computer-readable medium is provided. The computer-readable medium stores data instructions that, when executed by one or more processors, cause the one or more processors to compile observational data for a first plurality of media content, compile historical data for a second plurality of media content, train a reward model using the historical data, estimate distributions for each of the first plurality of media content using the reward model and the observational data, select samples from the distributions, select media content from the first plurality of media content based on the samples, and cause a computing device to present the selected media content. The observational data includes engagement data for each of the first plurality of media content during an observation period. The historical data includes engagement data for each of the second plurality of media content during a historical engagement period. Each distribution in the distributions defines an estimated range of engagement days for an optimization period.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
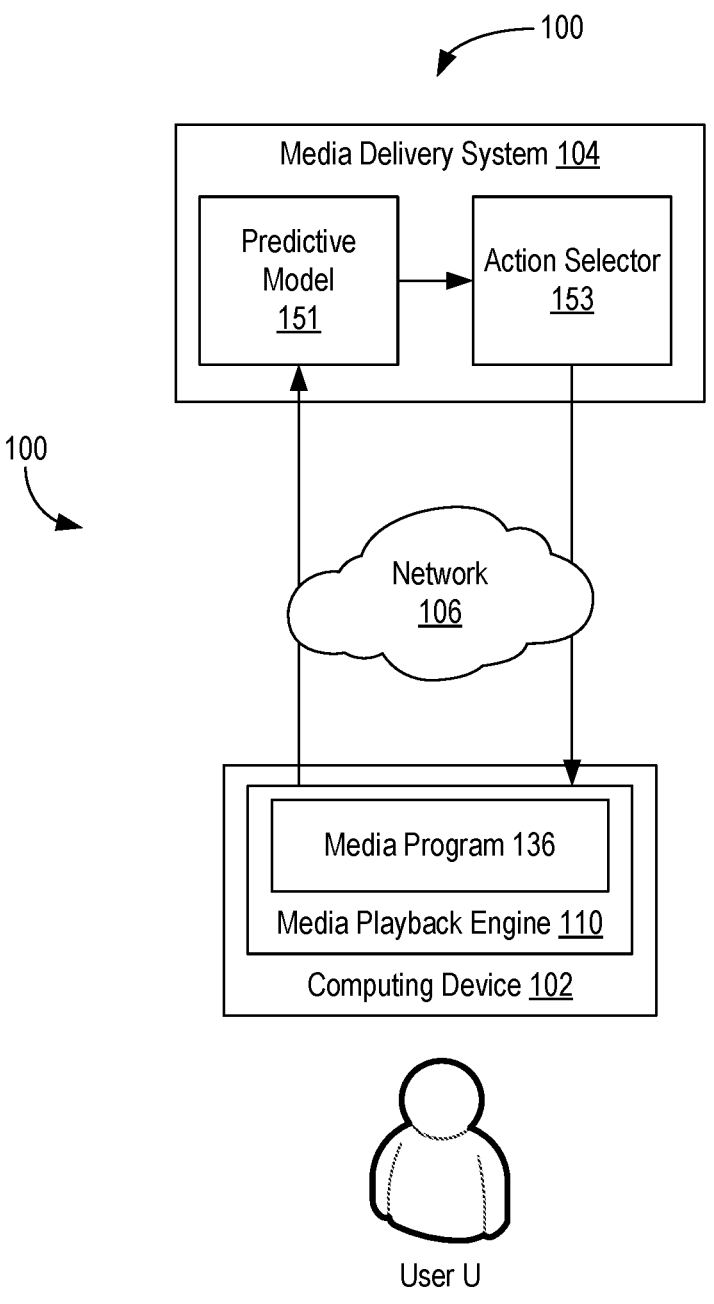
FIG. 1 illustrates a schematic block diagram of an example media playback system for optimizing selection of media content for long-term outcomes.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

As used herein, the term "including" as used herein should be read to mean "including, without limitation," "including but not limited to," or the like. Additionally, "long-term outcomes" are described herein as outcomes at the end of optimization periods and engagement periods. In examples described herein, long-term outcomes are determined for 60-day periods; however, in other examples, long-term outcomes may be determined for periods of any length.

As briefly described above, embodiments of the present disclosure are directed to optimizing selection of media content for long-term outcomes. While examples described herein may refer to a specific form of media content—such as media programs—the systems and methods described herein are applicable to any form of media content, including audio and video media content, either as individual media content items, including episodes of a podcast show and audio tracks (e.g., songs), or as grouped media content items, including media programs, playlists, and albums. Further, while the examples herein describe selecting media content, the systems and methods herein are applicable to selecting any type of action when optimizing for long-term outcomes, even when the action is unrelated to media content. For example, the system and methods herein are applicable to selecting machine learning models to continue training from among a group of machine learning models that have undergone initial rounds of training.

In example aspects, a predictive model and an action selector are used to select media content for optimizing a long-term outcome, such as maximizing a number of engagement days during an optimization period—for example, a 60-day period after discovery of the media content by a user. The predictive model combines historical data from historical engagement periods and observational data from observation periods to output distributions for the media content. For example, the distributions represent an estimated range of engagement days for the media content during the optimization period. The action selector selects media content based on samples from the distributions. By selecting the media content based on the samples from predicted distributions rather than selecting the media content based on an average expected long-term outcome, an effective balance can be achieved between exploration—i.e., selecting media content so that more data can be collected related to that media content—and efficiency—i.e., selecting media content that is likely to have a high expected reward, such as a high number of engagement days over the optimization period.

In further aspects, as additional observational data is collected as it becomes available, the predictive model is updated with the new observational data. By continually updating the predictive model as more observational data becomes available, the predictive model may output more accurate distributions. The media content selected by the action selector may then be more likely to be media content with a more optimal long-term outcome—e.g., the media content is more likely to have a high number of engagement days over the optimization period.

Turning to FIG. 1, an example media playback system 100 for optimizing selection of media content for long-term outcomes is shown. In the illustrated embodiment, the system 100 includes a user computing device 102 connected to a media delivery system 104 via a network 106. Although the illustrated embodiment shows one computing device 102, in alternative embodiments, multiple computing devices 102 are connected to the media delivery system 104.

In the illustrated embodiment, the media delivery system 104 includes a predictive model 151 and an action selector 153. The predictive model 151 uses data—including historical data and observational data—from the computing device 102 or other computing devices to predict distributions for media content during an optimization period. In an example, the distributions define an expected number of engagement days for the media content over the optimization period. The action selector 153 selects samples from the distributions output by the predictive model 151, and uses the samples to select media content for a user U. In the illustrated embodiment, the action selector 153 selected a media program 136 to be presented to the user U. In an example, the media program 136 is a podcast show.

In the illustrated embodiment, the computing device 102 is a media playback device. In such embodiments, the computing device 102 includes a media playback engine 110 that presents media content to the user U, such as the media program 136. In an example, the media program 136 is presented to the user U by displaying a listing for the media program 136 in a user interface. In an alternative example, the media program 136 is presented to the user U by the media playback engine 110 playing the media program 136 or a media content item associated with the media program 136—e.g., an episode of a podcast show.

Although the illustrated embodiment shows a media program 136, other types of media content may be selected by the media delivery system 104 and presented to the user U. In alternative example, the media content is any type of audio, visual, or audio/visual media content either as individual media content items or as groups of media content items, including audio tracks, episodes of a podcast show, audiobooks, advertisements, and playlists.

As the user U engages with the media program 136, additional observational data is collected. The additional observational data is sent back to the media delivery system 104 and can be used to select media programs 136 for additional users. The additional observational data allows the predictive model 151 to update the predicted distributions, and the action selector 153 can select new samples from the updated predicted distributions, and media content for the additional users can be selected by the action selector 153 using the new samples. The system 100 can continually cycle through selecting media content and updating observational data, allowing for more optimal selections to be made as time progresses and more observational data becomes available to the predictive model 151.

Figure 2:
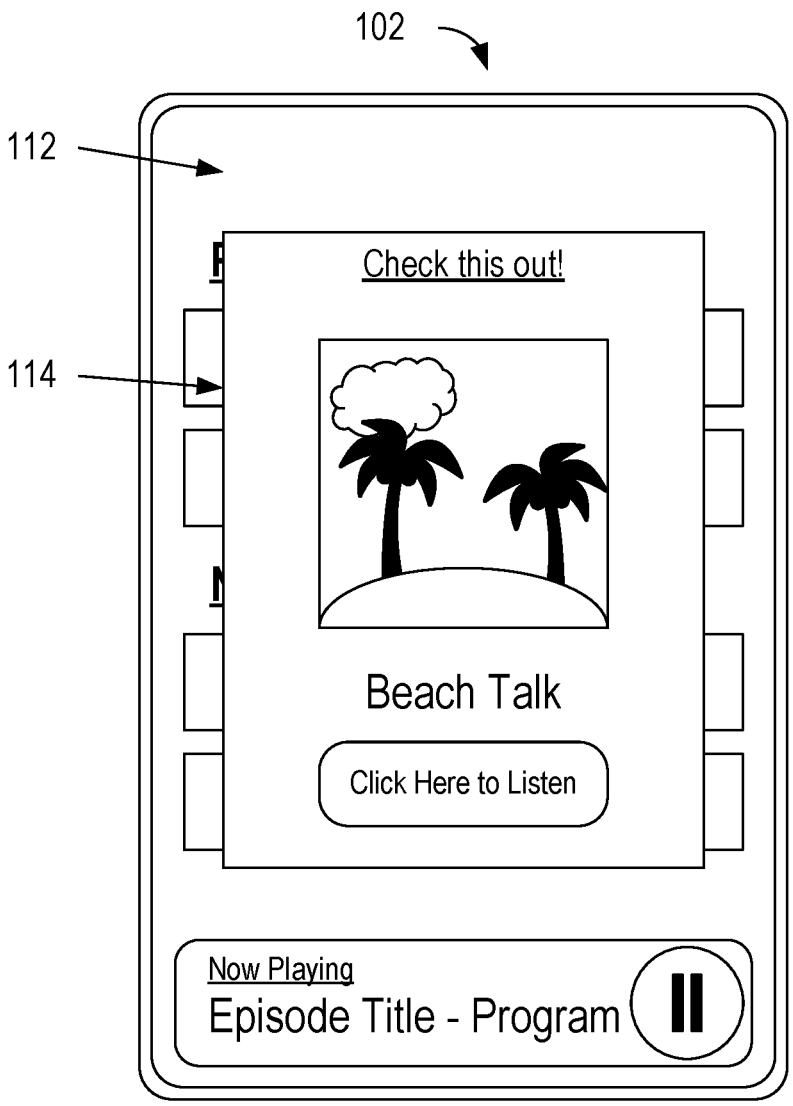
FIG. 2 illustrates an example of media content being presented.

FIG. 2 illustrates an example embodiment of a user interface 112 displayed on a computing device 102 to present selected media content to a user. As previously described, media content selected by an action selector can be presented to a user by displaying a listing for the media content in the user interface 112. In the illustrated embodiment, the user interface 112 includes an overlay 114 that displays a listing for selected media content. In alternative embodiments, the user interface 112 includes alternative visual elements to present a listing for selected media content.

Figure 3:
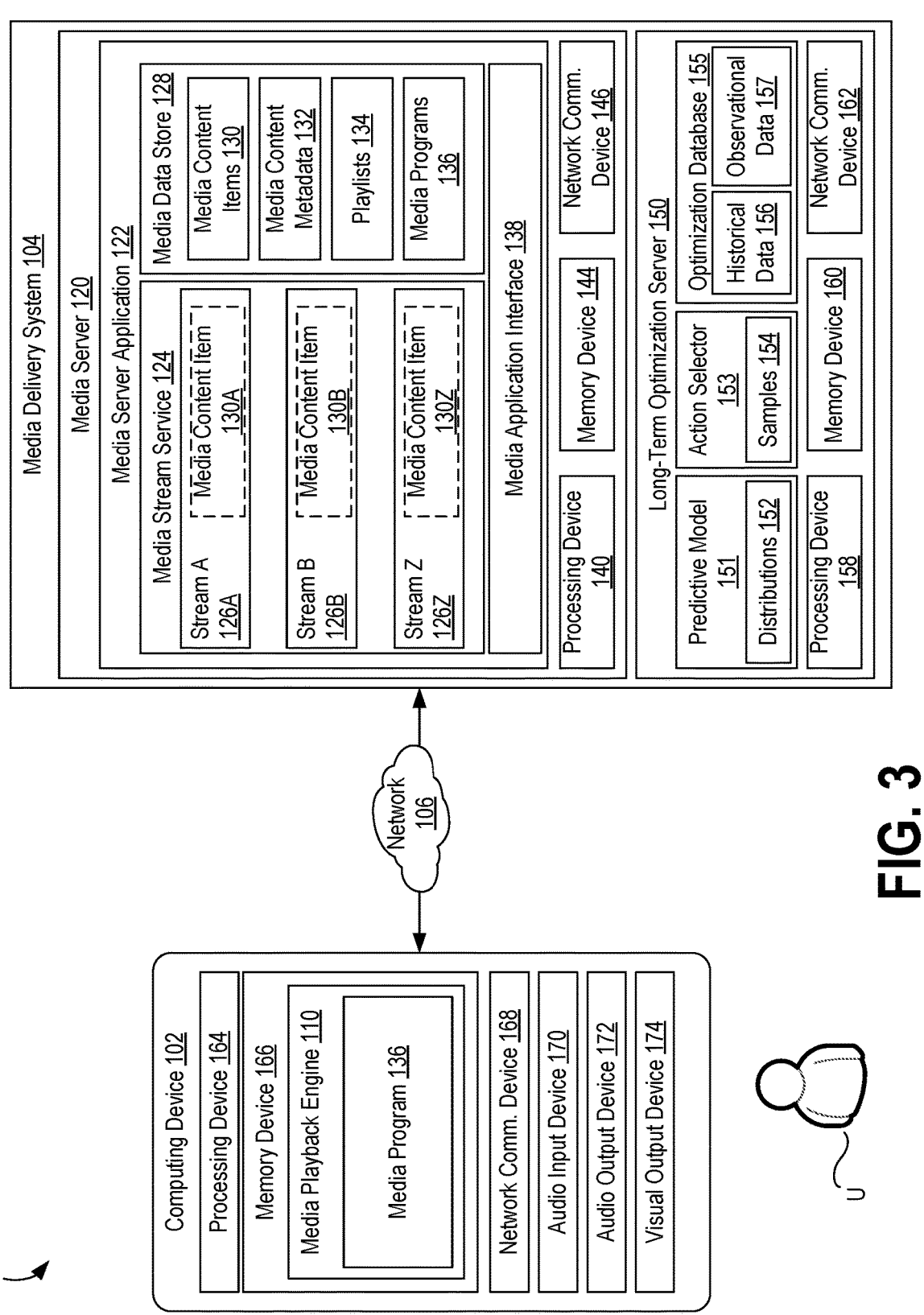
FIG. 3 illustrates a schematic block diagram of another example of a media playback system shown in FIG. 1.

FIG. 3 illustrates a schematic block diagram illustrating another example of the media playback system 100 shown in FIG. 1. In this example, the media playback system 100 includes the computing device 102 for a user U and the media delivery system 104. The network 106 is also shown for communication between the computing device 102 and the media delivery system 104.

As described herein, the computing device 102 operates to present media content items 130 and media programs 136 to a user U through the media playback engine 110. In some embodiments, the computing device 102 operates to play media content items 130 that are provided (e.g., streamed, transmitted, etc.) by a system remote from the computing device 102 such as the media delivery system 104, another system, or a peer device. Alternatively, in some embodiments, the computing device 102 operates to play media content items stored locally on the computing device 102. Further, in at least some embodiments, the computing device 102 operates to play media content items that are stored locally as well as media content items provided by remote systems.

In some embodiments, the computing device 102 includes a processing device 164, a memory device 166, a network communication device 168, an audio input device 170, an audio output device 172, and a visual output device 174. In the illustrated example, the memory device 166 includes the media playback engine 110 which presents media programs 136 to the user U. In alternative embodiments, media content items 130 are presented to the user U through the media playback engine 110. Other embodiments of the computing device 102 include additional, fewer, or different components. Examples of computing devices include a smartphone, a smart speaker, and a computer (e.g., desktop, laptop, tablet, etc.).

In some embodiments, the processing device 164 comprises one or more processing devices, such as central processing units (CPU). In other embodiments, the processing device 164 additionally or alternatively includes one or more digital signal processors, field-programmable gate arrays, or other electronic circuits. In some embodiments, the processing device 164 includes at least one processing device that can execute program instructions to cause the at least one processing device to perform one or more functions, methods, or steps as described herein.

The memory device 166 operates to store data and program instructions. In some embodiments, the memory device 166 stores program instructions for the media playback engine 110 that enables playback and presentation of media content items 130 and media programs 136 received from the media delivery system 104. As described herein, the media playback engine 110 is configured to communicate with the media delivery system 104 to receive one or more media content items 130—e.g., through the media content streams 126 (including media content streams 126A, 126B, and 126Z).

The memory device 166 includes at least one memory device. The memory device 166 typically includes at least some form of computer-readable media. Computer-readable media include any available media that can be accessed by the computing device 102. By way of example, computer-readable media can include computer-readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read-only memory, electrically erasable programmable read-only memory, flash memory and other memory technology, compact disc read-only memory, blue ray discs, digital versatile discs or other optical storage, magnetic cassettes, magnetic tape, magnetic disk storage or other magnetic storage devices, or any other medium that can be accessed by the computing device 102. In some embodiments, computer-readable storage media is non-transitory computer-readable storage media.

Computer-readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

The network communication device 168 is a device that operates to communicate data across the network 106. The network communication device 168 allows the computing device 102 to communicate with remote devices, such as with the media server 120 and the long-term optimization server 150 of the media delivery system 104. Examples of the network communication device 168 include wired and wireless data communication devices, such as a cellular, WIFI, BLUETOOTH™, LoRa, and wired (e.g., Ethernet) communication device.

Some embodiments include an audio input device 170 that operates to receive audio input, such as voice input provided by the user U. The audio input device 170 typically includes at least one microphone. In some embodiments, the audio input device 170 detects audio signals directly, and in other embodiments, the audio input device 170 communicates with another device that detects the audio signals (such as through a Bluetooth-connected microphone).

The audio output device 172 operates to output audible sounds, such as the media content and other audio outputs, such as audio cues. In some embodiments, the audio output device 172 generates media output to play media content to the user U. Examples of the audio output device 172 include a speaker, an audio output jack, and a Bluetooth transceiver (such as for communication with a Bluetooth-connected speaker). In some embodiments, the audio output device 172 generates an audio output directly, and in other embodiments, the audio output device 172 communicates with another device that generates the audio output. For example, the audio output device 172 may transmit a signal through an audio output jack or a Bluetooth transmitter that can be used to generate the audio signal by a connected or paired device such as headphones or a speaker.

Some embodiments also include a visual output device 174. The visual output device 174 includes one or more light-emitting devices that generate a visual output. Examples of the visual output device 174 include a display device (which can include a touch-sensitive display device) and lights such as one-or-more light-emitting diodes (LEDs). In an example, the visual output device 174 operates to display a user interface to the user U with a listing for a media program 136.

Still with reference to FIG. 3, the media delivery system 104 includes one or more computing devices, such as the media server 120 that provides media content to the computing device 102, and the long-term optimization server 150 that selects media content to be provided to the computing device 102. Each of the media server 120 and the long-term optimization server 150 can include multiple computing devices in some embodiments. Although shown as separate servers, the media server 120 and the long-term optimization server 150 are the same server in some embodiments.

In some embodiments, the media delivery system 104 operates to transmit media content items 130 and media programs 136 to one or more media playback devices such as the computing device 102.

In this example, the media server 120 comprises a media server application 122, a processing device 140, a memory device 144, and a network communication device 146. The processing device 140, memory device 144, and network communication device 146 may be similar to the processing device 164, memory device 166, and network communication device 168 respectively, which have been previously described.

In some embodiments, the media server application 122 operates to stream music or other audio, video, or other forms of media content. The media server application 122 includes a media stream service 124, a media data store 128, and a media application interface 138.

The media stream service 124 operates to buffer media content such as media content items 130 (including 130A, 130B, and 130Z) for streaming to one or more streams 126 (including 126A, 126B, and 126Z).

The media application interface 138 can receive requests or other communication from the media playback devices (such as the computing device 102) or other systems, to retrieve media content items 130 from the media delivery system 104. For example, in FIG. 3, the media application interface 138 receives communications from the media playback engine 110 of the computing device 102.

In some embodiments, the media data store 128 stores media content items 130, media content metadata 132, playlists 134, and media programs 136. In an example, the media data store 128 comprises one or more databases and file systems. Other embodiments are possible as well. As noted above, the media content items 130 may be audio, video, or any other type of media content, or a combination of any type of media content items, which may be stored in any format for storing media content. Examples of media content items 130 include music tracks, audiobooks, podcast shows, advertisements, and any other form of media content.

The media content metadata 132 operates to provide information associated with the media content items 130. In some embodiments, the media content metadata 132 includes one or more of title, artist, lyrics, album name, length, genre, mood, era, captions, or other media metadata.

The playlists 134 operate to identify one or more of the media content items 130. In some embodiments, the playlists 134 identify a group of the media content items 130 in a particular order. In other embodiments, the playlists 134 merely identify a group of the media content items 130 without specifying a particular order. Some, but not necessarily all, of the media content items 130 included in a particular one of the playlist 134 are associated with a common characteristic such as a common genre, mood, or era.

The media programs 136 also operate to identify one or more of the media content items 130. In an example, a media program 136 is a podcast show, and the media program 136 identifies media content items 130 that are episodes of the podcast show. Like with the playlists, embodiments of media programs 136 identify a group of media content items 130 in a particular order, while alternative embodiments do not specify a particular order.

In this example, the long-term optimization server 150 includes a predictive model 151, an action selector 153, an optimization database 155, a processing device 158, a memory device 160, and a network communication device 162. The predictive model 151 outputs distributions 152 that are used by the action selector 153 to select samples 154. The optimization database maintains data used by the predictive model 151, including historical data 156 and observational data 157.

In some embodiments, any one or more of the functions, methods, and operations described herein as being performed by the long-term optimization server 150—or components of the long-term optimization server 150, such as the predictive model 151 and the action selector 153—can alternatively be performed by the media playback engine 110. This may include embodiments where the media delivery system 104 does not include a long-term optimization server 150 and embodiments where the long-term optimization server 150 cooperates with the media playback engine 110 and the functions are split between those components.

Components of the long-term optimization server 150 can operate on a single computing device, or by cooperation of multiple computing devices. For example, the predictive model 151 can operate solely on the computing device 102 or solely on the long-term optimization server 150. Alternatively, portions of components of the long-term optimization server 150 can be performed by one or more other computing devices, such as by data communication between the computing device 102 and the media delivery system 104.

The processing device 158, memory device 160, and network communication device 162 may be similar to the processing device 164, memory device 166, and network communication device 168 respectively, which have each been previously described.

In various embodiments, the network 106 includes one or more data communication links, which may include multiple different types. For example, the network 106, can include wired and/or wireless links, including BLUETOOTH™, ultra-wideband (UWB), 802.11, ZigBee, cellular, LoRa, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

Turning to FIGS. 4-9, an example of selecting media content for optimal long-term outcomes is shown. In the examples described herein, media programs are selected to optimize engagement days with the media programs. In alternative examples, different types of media content are selected. Examples of media content that can be selected include media content items (such as audio tracks and audiobooks) and groups of media content items (such as playlists). In further examples, any type of audio, visual, or audio/visual media content can be selected. Additionally, different long-term outcomes are considered in different examples. Examples of long-term outcomes include a number of interactions with the media content items (such as views/listens, likes, and comments) and a number of minutes a user watched/listened to the media content. In further examples, any metric can be used to measure a long-term outcome.

Figure 4:
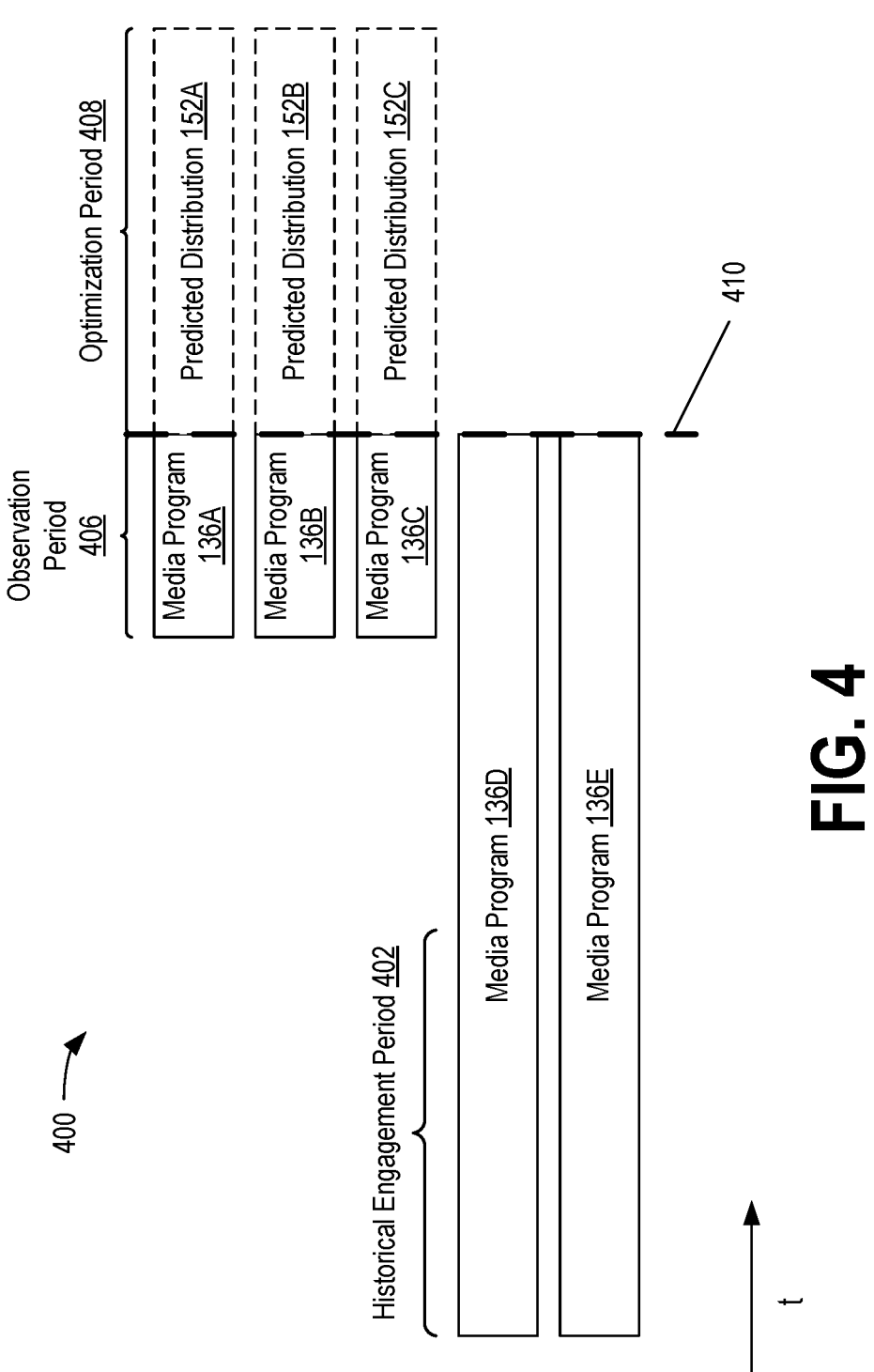
FIG. 4 illustrates an example timeline of selecting media content for optimal long-term outcomes.

FIG. 4 illustrates an example timeline 200 of selecting media content for optimal long-term outcomes. In the illustrated example, the timeline 200 includes a historical engagement period 402, an observation period 406, and an optimization period 408. The observation period 406 is a period of time between a release of a media program 136 and a current time 410. The optimization period 408 is a period of time that occurs after the current time 410 for which long-term outcomes are predicted. In examples, the histori- cal engagement period 402 is the same length as the opti- mization period 408. For example, the historical engagement period 402 and the optimization period 408 may both be 60 days.

In the illustrated embodiment, three pieces of media content are considered for selection: a first media program 136A, a second media program 136B, and a third media program 136C. In alternative embodiments, any number media programs may be considered for selection. In the illustrated embodiment, each of the first, second, and third media programs 136A-C were released at the same time, so the observation period 406 is the same for each of the media programs 136A-C. In alternative embodiments, the media programs 136A-C may be released at different times. Accordingly, each media program 136 A-C may be associ- ated with observation periods 406 that cover different peri- ods of time before the current time 410. Because the release of the media programs 136A-C was shortly before the current time 410, limited data is available for the first, second, and third media programs 136A-C.

As the observation period 406 progresses to the current time 410, observational data is collected from one or more users for the first, second, and third media programs 136A- C. In an example, the users from which the observational data is collected does not include the user for which the media content is selected; the user for which the media content is selected has not engaged with the media content considered for selection before the current time 410.

The observational data includes intermediate outcomes during the observation period 406. In an example, the observational data is engagement data. In embodiments, engagement data includes a number of engagement days by users for each of the first, second, and third media programs 136A-C during the observation period 406. In an alternative embodiment, the engagement data includes interaction data that includes numbers of interactions users had with the first, second, and third media programs 136A-C. In a further embodiment, the engagement data includes listening data that includes amounts of time—e.g., numbers of minutes— users watched/listened to the first, second, and third media programs 136A-C. In other embodiments, the engagement data includes any type of data that measures values related to a metric on which a long-term outcome is based.

Because limited observational data is available for the first, second, and third media programs 136A-C, historical data is also used to determine which of the first, second, and third media programs 136A-C to select. In the illustrated embodiment, historical data for a fourth media program 136D and a fifth media program 136E is used. In alternative embodiments, historical data for any number of media programs may be used. In embodiments, the historical data for the fourth and fifth media programs 136D-E includes data from the historical engagement period 402. In alterna- tive embodiments, the historical data includes all data avail- able for the fourth and fifth media programs 136D-E from before the current time 410.

In an example, similar to the observational data, the historical data includes intermediate outcomes from the historical engagement period 402—e.g., the historical data includes engagement data that includes a number of engage- ment days by users for each of the fourth and fifth media programs 136D-E during the historical engagement period

402. The historical data for the fourth and fifth media programs 136D-E includes observational data from the entirety of the historical engagement period 402. Accord- ingly, in embodiments, the historical data also includes long-term outcomes from the end of the historical engage- ment period 402.

In the illustrated embodiment, the historical engagement period 402 is the same for both the fourth and fifth media programs 136D-E. In alternative examples, the historical engagement period 402 is different for the fourth and fifth media programs 136D-E. For example, in alternative examples, the fourth and fifth media programs 136D-E may have been discovered at different times, so each of the fourth and fifth media programs 136D-E may be associated with historical engagement periods 402 that begins when the fourth and fifth media programs 136D-E are discovered. In embodiments, historical optimization periods 402 are any periods after the release of the fourth and fifth media programs 136D-E, including periods that begin when users discover the fourth or fifth media programs 136D-E. In embodiments, the fourth or fifth media programs 136D-E may have multiple historical engagement periods 402 from which historical data is collected. For example, if historical data is collected from multiple users, there may be a historical engagement period 402 associated with each user from which the historical data is collected, such as the first 60 days after the users discover the media programs 136D-E.

In an example, historical data for the fourth media pro- gram 136D and the fifth media program 136E are selected to use to supplement the observational data because of simi- larities between at least one of the fourth media program 136D and the fifth media program 136E and at least one of the first media program 136A, the second media program 136B, and the third media program 136C. In an example, similarities between the media programs 136A-E are deter- mined using metadata about the media programs 136A-E— such as categories, titles, and descriptions. In an example, all of the media programs 136A-E are sports podcast shows.

As described herein, the historical data for the fourth and fifth media programs 136D-E and the observational data for the first, second, and third media programs 136A-C are used in a predictive model to output predicted distributions 152A-C for the first, second and third media programs 136A-C. The predicted distributions 152A-C define expected outcomes for the first, second, and third media programs 136A-C throughout the optimization period 408. In an example, the predicted distributions 152A-C define estimated numbers of engagement days for the first, second, and third media programs 136A-C during the optimization period 408. As described herein, the predicted distributions 152A-C are used by an action selector to select from among the first, second, and third media programs 136A-C.

Figure 5:
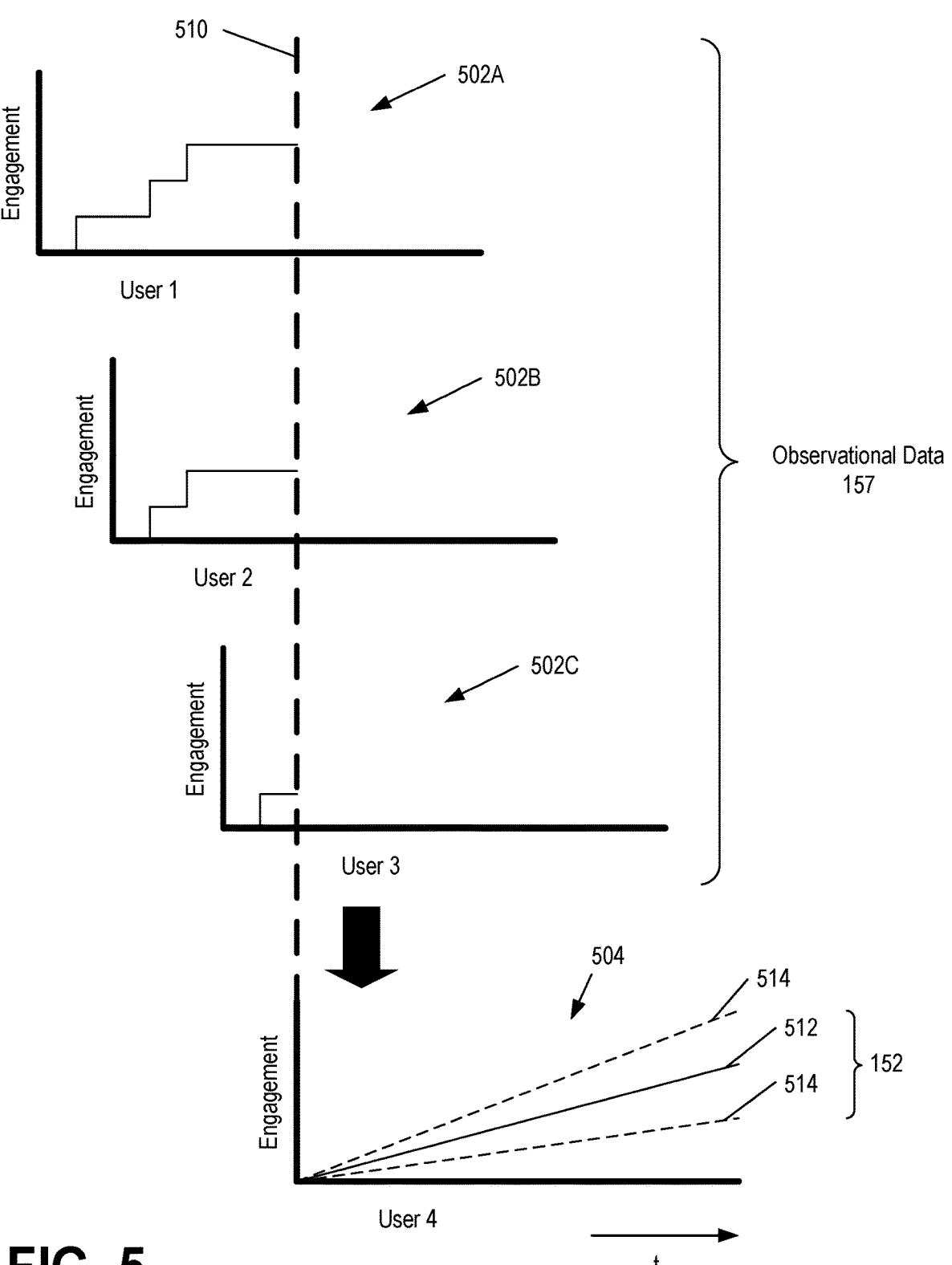
FIG. 5 illustrates example graphs representing observational data and a predicted distribution for media content at a first time.

FIG. 5 illustrates an example of observational data 157 being used to generate the predicted distribution 152 for a media program. As previously described, the observational data 157 is collected during an observation period before a current time 510. In the illustrated example, the observa- tional data 157 includes engagement data for three users, represented in graphs 502. For each of the three users, observational data is collected from a point that the user discovers the media program. Using the observational data 157 that shows engagement with the media program by the users during the observational period and historical data from one or more other media programs, a predictive model determines a predicted distribution 152 for a fourth user, represented in a graph 504. The predicted distribution 152 defines an expected outcome for the fourth user during an optimization period after the current time 510.

In embodiments, the predicted distribution 152 includes predicted intermediate outcomes for the optimization period, which are then used to determine the expected outcome at the end of the optimization period—for example, by summing the intermediate outcomes. In an example, the predicted distribution 152 includes predictions of which days in the optimization period that the user will engage with the media program. In an alternative example, the predicted distribution 152 includes estimated probabilities of the user engaging with the media program for each day of the optimization period.

In embodiments, the predictive distribution 152 includes a mean expected value 512 and variance 514. In an example, at the end of the optimization period, the predicted distribution 152 includes a mean expected value 512 of 10 engagement days and a variance 514 of ±5 days to define an expected range of engagement days of between 5 and 15 days by the end of the optimization period. In the illustrated embodiment, the mean expected value 512 and the variance 514 over the optimization period are linear functions. In alternative embodiments, such as when the predictive distribution 152 includes predictions of which days in the prediction period 208 that the user will engage with the media program, the mean expected value 212 and the variance 214 are step functions, similar to the observational data 157. In further embodiments, the mean expected value 212 and the variance 214 are other types of continuous or discontinuous functions.

Figure 6:
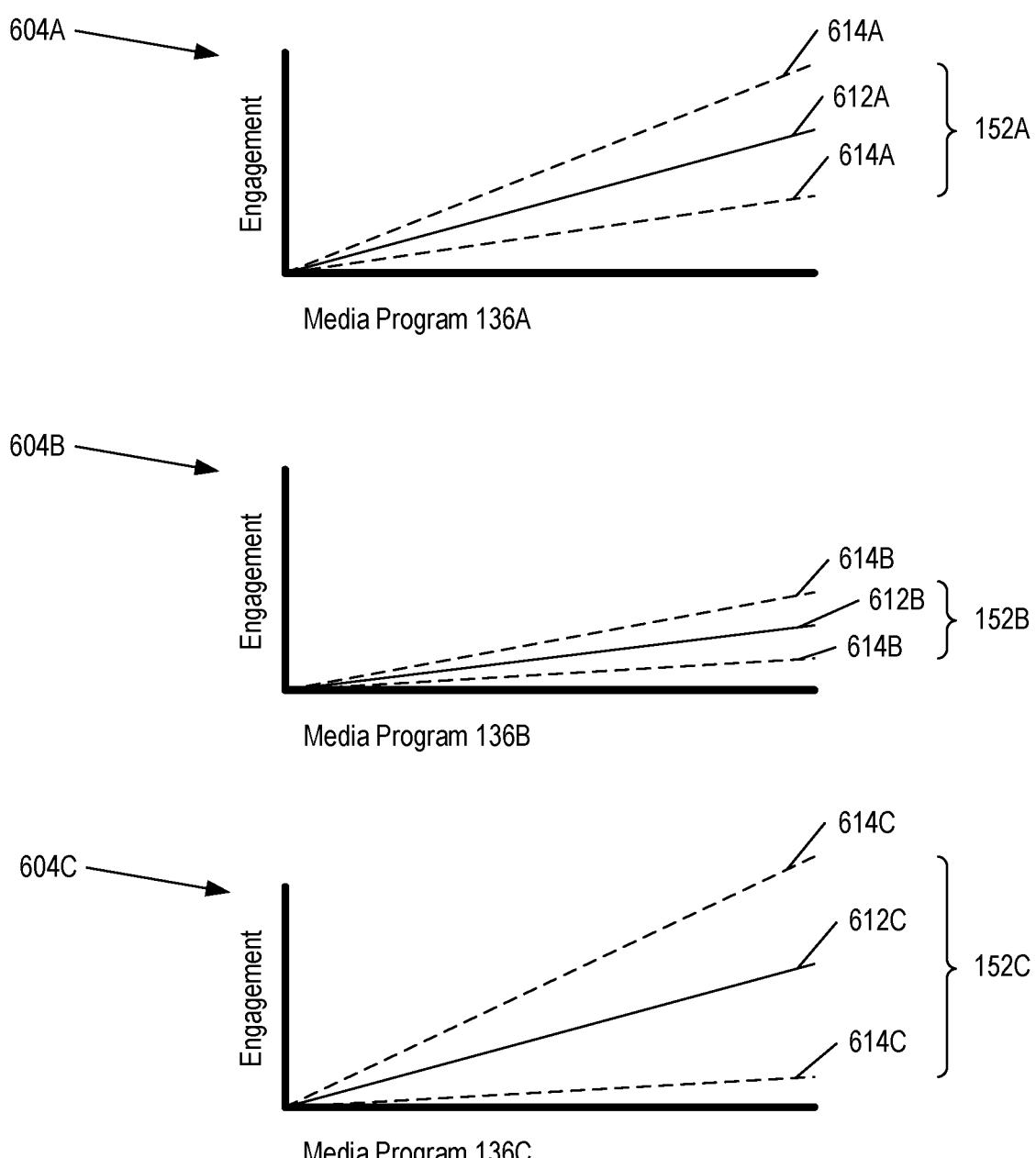
FIG. 6 illustrates example graphs representing predicted distributions for media content at a first time.

FIG. 6 illustrates example graphs 604 including predicted distributions 152 for multiple media programs 136. As described herein, samples from the predicted distributions 152 can be used to select a media program 136 to be presented to a user. In the illustrated embodiment, the media programs 136 have different predicted distributions 152. In an example, each media program 136 is associated with different observational data, resulting in different predicted distributions 152 for the media programs 136.

Figure 7:
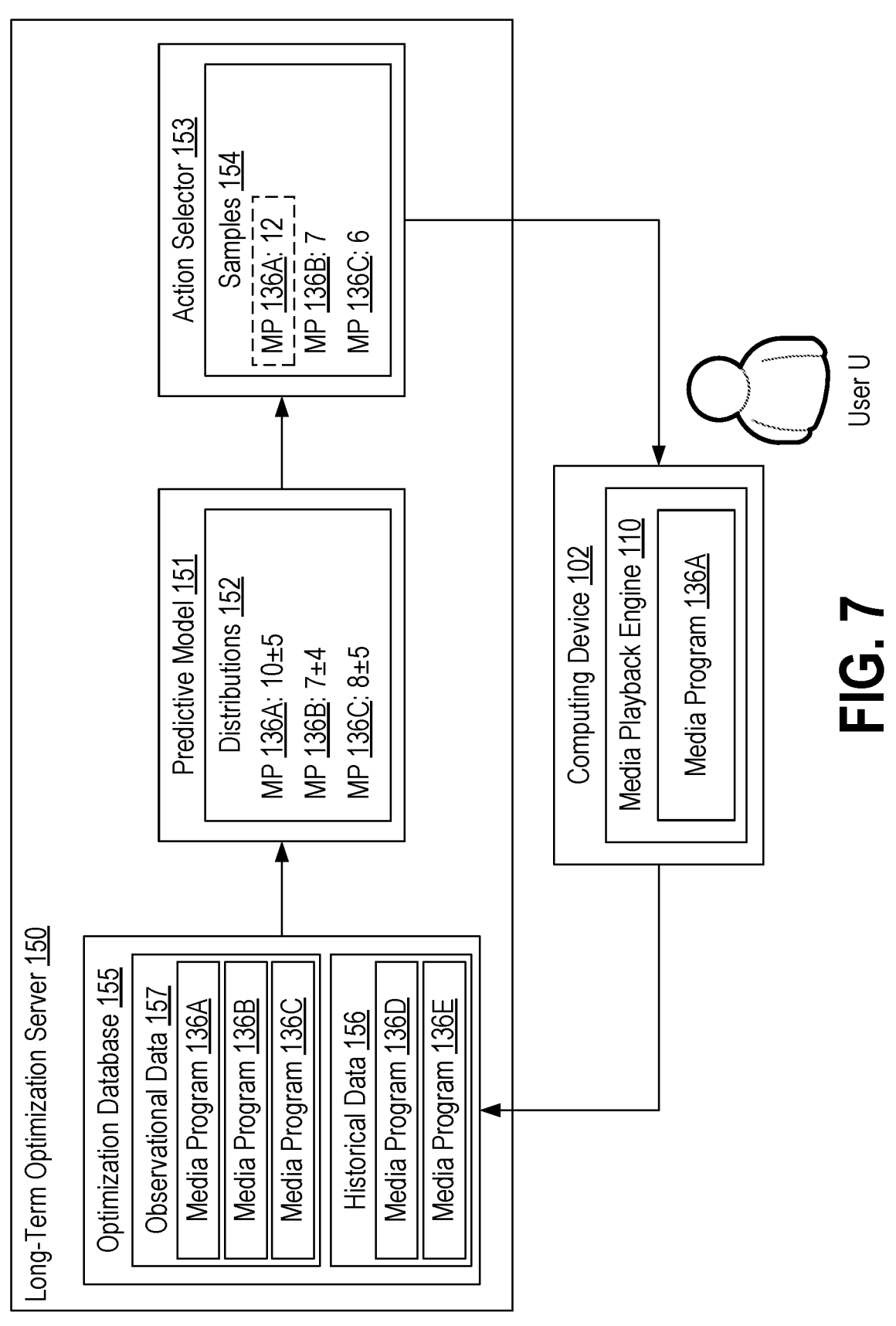
FIG. 7 illustrates an example embodiment of a predictive model and an action selector selecting media content at a first time.

FIG. 7 illustrates an example embodiment of a predictive model 151 and an action selector 153 selecting media content. The predictive model 151 determines predicted distributions 152 for the first, second, and third media programs 136A-C. In an embodiment, the predictive model 151 uses observational data 157 for the first, second, and third media programs 136A-C and historical data 156 for the fourth and fifth media programs 136D-E to determine the predicted distributions 152.

In an embodiment, the historical data 156 and the observational data 157 include traces that represent intermediate outcomes—i.e., engagement days—for the media programs 136A-E over historical engagement periods and observational periods. In embodiments, each media program 136A-E is associated with one or more traces, representing intermediate outcomes for one or users that have engaged with the media programs 136A-E during the historical engagement periods or the observational periods. In an embodiment, the traces are binary vectors with dimensions equal to the number of days of an optimization period—i.e., if an optimization period is 60 days long, the traces are 60-dimensional binary vectors. In alternative embodiments, the traces may have different dimensions. In an example, a "1" in a trace represents that a user engaged with the media program on a day and a "0" in the trace represents that the user did not engage with the media program on that day. Because observational data 157 for the first, second, and third media programs 136A-C is available for a limited observation period, traces associated with the first, second, and third media programs 136A-C may only be partially observed. For example, even though a trace for the first media program 136A may be 60-dimensional, the trace may include intermediate observations for 10 days (e.g., the first 10 dimensions of the trace), and the rest of the trace may be unobserved.

The historical data 156 is used to train the predictive model 151. In an embodiment, the predictive model 151 is a reward model. In alternative embodiments, the predictive model 151 is any type of model that makes predictions using data, including machine learning models.

In an embodiment, a mean trace vector and a noise covariance matrix are calculated for each media program 136D-E in the historical data 156. The mean trace vector ($\hat{z}_a$) and the noise covariance matrix ($\hat{V}_a$) are computed using the traces (z) and the number of traces ($M_a$) in a dataset ($H_a$) associated with a media program 136D-E in the historical data 156 using the following equations:

$$\hat{z}_a = M_a^{-1} \sum_{z \in H_a} z$$

$$\hat{V}_a = M_a^{-1} \sum_{z \in H_a} (z - \hat{z}_a)(z - \hat{z}_a)^T$$

Using the mean trace vector ($\hat{z}_a$) and the noise covariance matrix ($\hat{V}_a$) for each media program (a) in the set of media programs (A') in the historical data 156, parameters ($\mu$, $\Sigma$, V) for the predictive model 151 are estimated as empirical averages using the following equations:

$$\mu = |A'|^{-1} \sum_{a \in A'} \hat{z}_a$$

$$\sum = |A'|^{-1} \sum_{a \in A'} (\mu - \hat{z}_a)(\mu - \hat{z}_a)^T$$

$$V = |A'|^{-1} \sum_{a \in A'} \hat{V}_a$$

In alternative embodiments, different estimation methods are used to estimate the model parameters. In an example, type-II maximum likelihood—also known as empirical Bayes—methods are used.

In the illustrated embodiment, the long-term optimization server 150 includes a single predictive model 151 used to predict distributions for each of the first, second, and third media programs 136A-C. In alternative embodiments, multiple predictive models 151 are used—e.g., a different predictive model 151 is trained for each of the first, second, and third media programs 136A-C. In an example, training multiple different predictive models 151 is beneficial because the first, second, and third media programs 136A-C are different genres of media programs—e.g., the first media program 136A is a sports podcast show, the second media program 136B is a true crime podcast show, and the third media program 136C is an art podcast show. In another example, training multiple different predictive models 151 is beneficial because the first, second, and third media programs 136A-C are different types of media programs (or media content)—e.g., the first media program 136A is a podcast show, the second media program 136B is a television show, and the third media program 136C is a radio show. By training multiple predictive models 151, each predictive model 151 can be trained using historical data 157 from media programs 136 that are similar to the media programs 136 for which predicted distributions 152 are being determined.

Once the predictive model 151 is trained and the parameters are set, the predictive model 151 is used to determine predicted distributions 152 for the first, second, and third media programs 136A-C. In an embodiment, the predicted distributions 152 are determined by estimating intermediate outcomes—i.e., engagement days—for the first, second, and third media programs 136A-C over the optimization period.

In an example, the predicted distributions 152 include posterior distributions of the mean trace for the first, second, and third media programs 136A-C. In an example, the posterior distributions are multivariate Gaussians that include mean vectors and covariance matrices. In an embodiment, the mean vector ($\mu'$) and the covariance matrix ($\Sigma'$) of a posterior distribution are computed by the predictive model 151 with set parameters ($\mu, \Sigma, V$) based on a trace (z) in the observational data 157, the number of observed intermediate outcomes (l) in the trace, and the length of the ongoing optimization period (K) using the following equations, with $A_{:i,:j}$ denoting the submatrix obtained by taking the i first rows and the j first columns of the matrix A and $a_i$ denoting the first i elements of the vector a:

$$\mu' = \mu + \sum\nolimits_{:K,:l} \left( \sum\nolimits_{:l,:l} + V_{:l,:l} \right)^{-1} (z_{:l} - \mu_{:l})$$

$$\sum\nolimits' = \sum + \sum\nolimits'_{:K,:l} \left( \sum\nolimits_{:l,:l} + V_{:l,:l} \right)^{-1} \sum\nolimits_{:l,:K}$$

In some embodiments, the posterior distribution is based on multiple traces for a media program 136 in the observational data 157. For example, observational data for a media program 136 may be collected from multiple users, and each user is associated with a trace. In such embodiments, the posterior distribution is calculated by iterating through each trace in the observational data 157 for the media program 136. The following pseudocode of a first algorithm illustrates an example of calculating the mean vector ($\mu'$) and the covariance matrix ($\Sigma'$) of a posterior distribution based on multiple traces (z) in a set (D) of traces in the observational data 157 for a media program 136 using the predictive model 151 with set parameters ($\mu, \Sigma, V$) that uses the number of observed intermediate outcomes (l) in the trace and the length of the ongoing optimization period (K), with $A_{:i,:j}$ denoting the submatrix obtained by taking the i first rows and the j first columns of the matrix A and $a_i$ denoting the first i elements of the vector a:

| | |
|---|---|
| 1) | $\mu' \leftarrow \mu$ |
| 2) | $\Sigma' \leftarrow \Sigma$ |
| 3) | for (z, l) $\in$ D do |
| 4) | $A \leftarrow \Sigma'_{:K,:l}(\Sigma'_{:l,:l} + V_{:l,:l})^{-1}$ |
| 5) | $\mu' \leftarrow \mu + A(z_{:l} - \mu'_{:l})$ |
| 6) | $\Sigma' \leftarrow \Sigma' + A\Sigma'_{:l,:K}$ |
| 7) | end for |

In alternative embodiments, the posterior distributions are calculated in a different procedure. For example, while the example pseudocode of the first algorithm indicates a sequential procedure, in alternative embodiments, the posterior distribution is updated using multiple traces in a single batch, rather than processing each trace independently. In another example, the posterior distribution is updated iteratively using previous values for the posterior distribution and updating the values based on new observational data

157. Additionally, in some embodiments, posterior distributions are calculated for each media program 136. In alternative embodiments, posterior distributions are only calculated for media programs 136 for which new observational data 157 is available.

The posterior distributions of the mean trace of a media program 136 is used to determine an expected long-term outcome—i.e., outcomes at the end of the ongoing optimization period, such as an expected number of engagement days during the ongoing optimization period. In an embodiment, the predicted distributions 152 include the expected long-term outcomes, which define ranges.

In an embodiment, the expected long-term outcome has a mean ($\mu$) and a variance ($\sigma^2$), which are products of a vector of predetermined weights (w) and the mean vector ($\mu'$) and covariance matrix ($\Sigma'$) of a posterior distribution according to the following equations:

$$\mu = w^T \mu'$$

$$\sigma^2 = w^T \sum\nolimits' w$$

In an embodiment, the predetermined weights are all 1. In such an embodiment, the long-term outcome is a sum of values in a trace. In alternative embodiments, other values are used for the weights.

The embodiment illustrated in FIG. 7 shows example predicted distributions 152 for the first, second, and third media programs 136A-C. In the example embodiment, the first media program 136A has a predicted distribution 152 of 10±5 engagement days, the second media program 136B has a predicted distribution 152 of 7±4 engagement days, and the third media program 136C has a predicted distribution 152 of 8±5 engagement days. In the illustrated embodiment, the predicted distributions 152 include integers. In alternative embodiments, the predicted distributions 152 include any real number.

After the predicted distributions 152 are determined by the predictive model 151, the predicted distributions 152 are used by the action selector 153 to select samples 154 from the predicted distributions 152. The action selector 153 then selects a media program 136 based on the selected samples 154.

In an embodiment, samples 154 are selected by the action selector 153 using Thompson sampling. In alternative embodiments, sample 154 are selected using alternative methods, including random sampling.

After the samples 154 are selected by the action selector 153, the action selector 153 selects a media program 136 based on the samples 154. In an embodiment, the action selector 153 selects the media program 136 associated with the sample 154 with the highest value. In alternative embodiments, different criteria are used to determine which media program 136 is selected. If multiple samples 154 are tied based on the criterion, the action selector 153 uses tiebreakers to select from among the tied samples 154. In an example, the action selector 153 selects the sample 154 with the highest mean in the associated predicted distribution 152. In another example, the action selector 153 randomly selects from among the tied samples 154. In further examples, any tiebreaking method may be used.

In the illustrated embodiment, the first media program 136A has a sample 154 of 12, the second media program 136B has a sample 154 of 7, and the third media program 136C has a sample 154 of 6. As is shown in the illustrated example, the sample 154 can be greater than, less than, or equal to a mean of the predicted distribution 152. The action selector 153 selects the first media program 136A because the sample 154 associated with the first media program 136A is the highest among the samples 154. In the illustrated embodiment, the samples 154 include integers. In alternative embodiments, the samples 154 include any real number.

After a media program 136 is selected, the selected media program 136 is sent to a computing device 102 of a user U and presented. In an example, the user U may be the fourth user from FIG. 5. As described above, in some embodiments, presenting the media program 136 includes displaying a user interface with a listing for the media program 136. In alternative embodiments, presenting the media program 136 includes playing the media program 136—or a media content item associated with the media program 136—on the computing device 102. In the illustrated embodiment, because the first media content item 136A was selected by the action selector 153, the first media content item 136A is presented on the computing device 102 for the user U.

Over time, as the user U and other users engage more with media programs 136A-C, further observational data 157 is collected. Using the new observational data, the predictive model 151 can update the predicted distributions 152, and media programs 136 can be selected for users based on samples 154 from the updated predicted distributions 152.

Although the illustrated embodiment shows one computing device 102 receiving a selected media program 136 from the action selector 153, in alternative embodiments, multiple computing devices 102 receive selections. In some embodiments, each computing device 102 receives the same selected media program 136. In alternative embodiments, the computing devices 102 receive different selected media programs 136.

Figure 8:
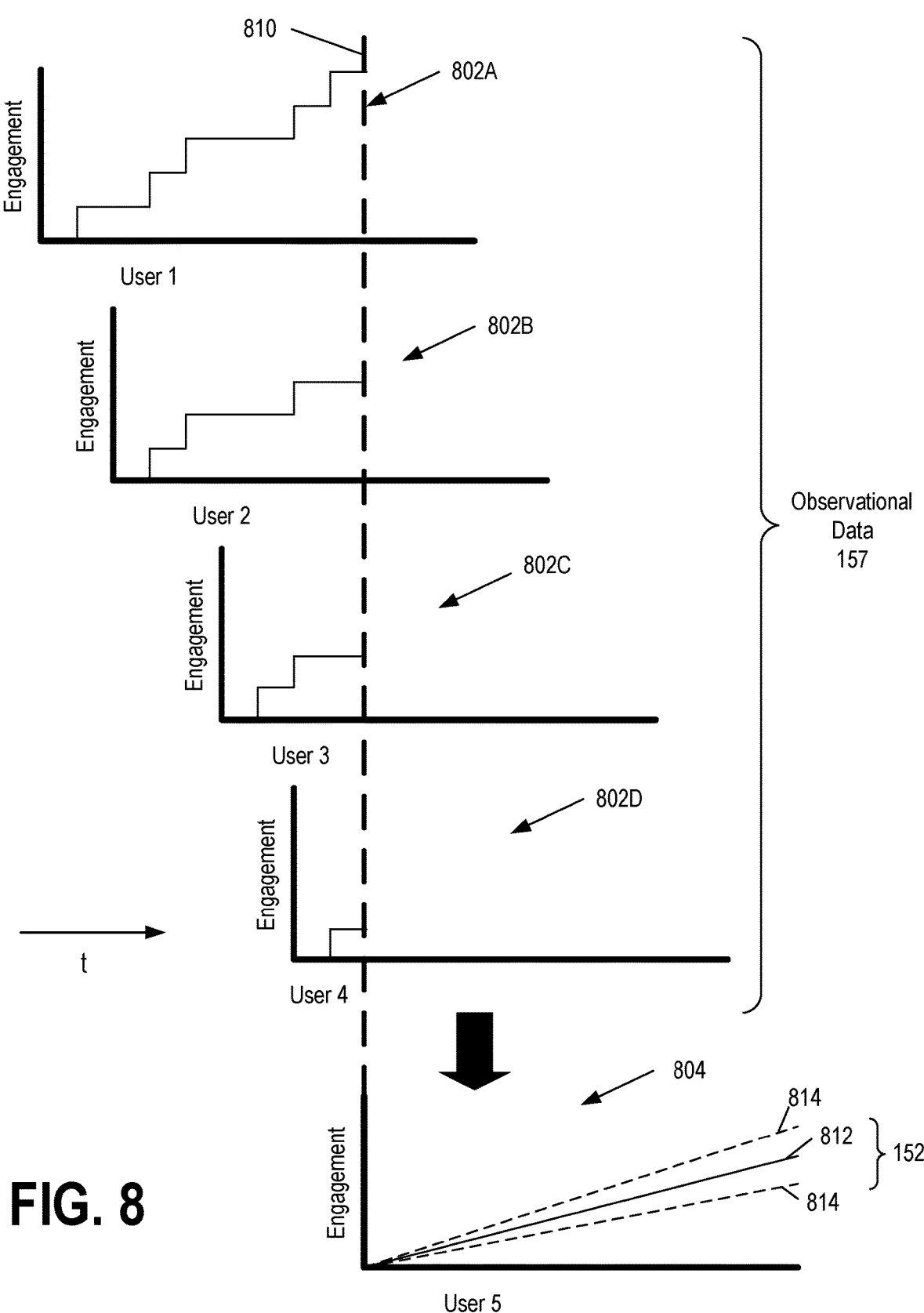
FIG. 8 illustrates the example graphs of FIG. 5 at a second time.
Figure 9:
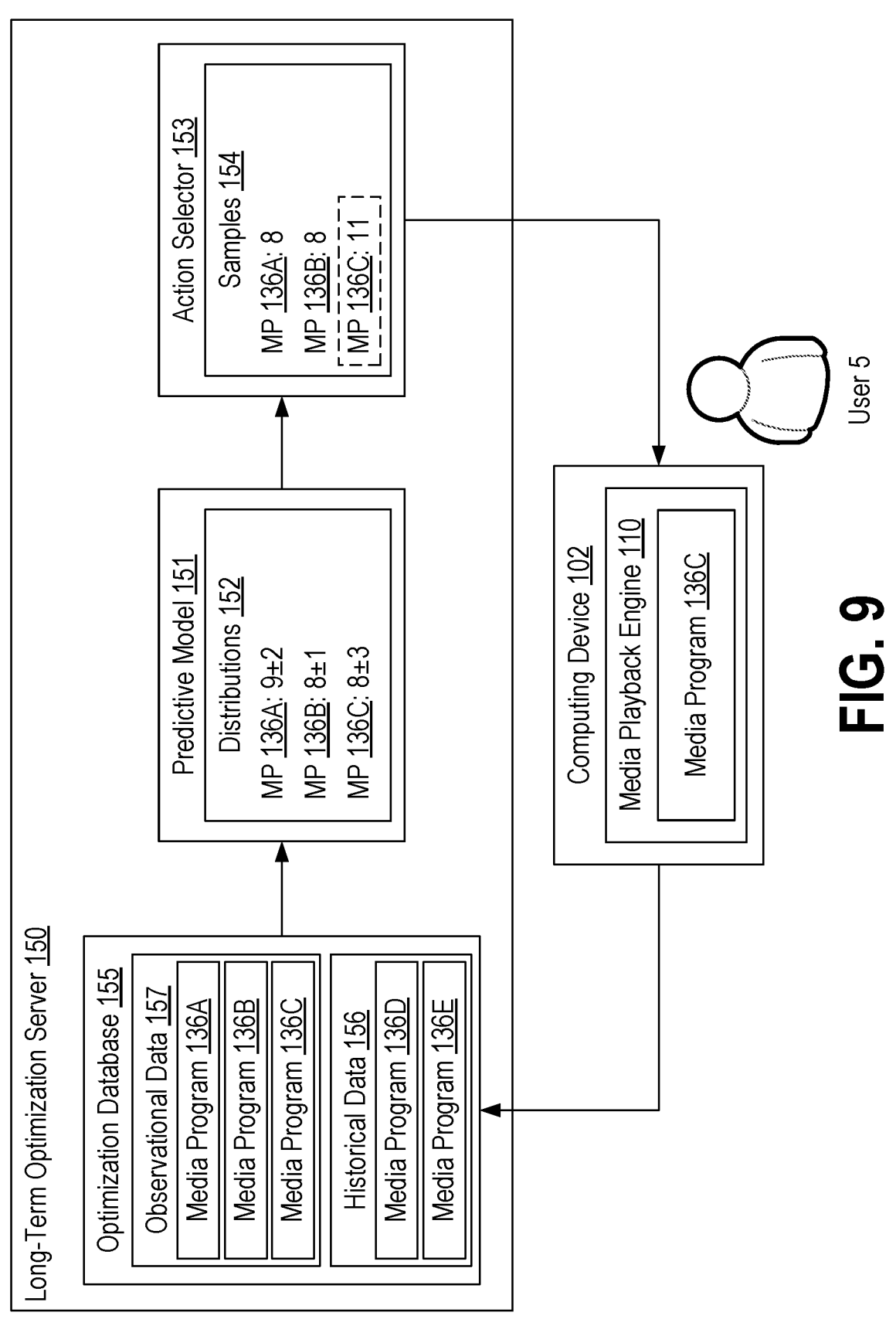
FIG. 9 illustrates the example embodiment of a predictive model and an action selector of FIG. 7 selecting media content at a second time.

FIGS. 8 and 9 illustrate examples of the graphs in FIG. 5 and the predictive model 151 and the action selector 153 in FIG. 7, respectively, at a later point in time after more observational data is collected. Because more time has passed, more observational data 157 has been collected, and more accurate predicted distributions 152 can be determined.

As shown in FIG. 8, more observational data 157 is collected for each of the first three users, which is represented in graphs 802A-C. Additionally, because the media program was selected for the fourth user and the fourth user engaged with the media program, observational data 157 is collected for the fourth user, which is represented in a graph 802D. This observational data 157 can be used to determine a predicted distribution 152 for a fifth user. As described above, the predicted distribution includes a mean 812 and a variance 814, represented in a graph 804. Because more observational data 157 is available when the predicted distribution 152 for the fifth user is determined, the predicted distribution may be more accurate. In the illustrated example, the variance 814 is smaller because more observational data 157 is available.

FIG. 9 illustrates the predictive model 151 determining predicted distributions 152 and the action selector 153 selecting samples and a media program 136 at the later point in time. With the updated observational data 157, updated predicted distributions 152 are determined by the predictive model 151. The predicted distributions 152 are determined using the same process as described above. In the illustrated embodiment, the first media program 136A has a predicted distribution 152 of 9±2 engagement days, the second media program 136B has a predicted distribution 152 of 8±1 engagement days, and the third media program 136C has a predicted distribution 152 of 8±3 engagement days. As is shown in a comparison of FIGS. 7 and 9, the updated predicted distributions 152 shown in FIG. 8 have smaller ranges when more observational data 157 is available, and the mean of the predicted distribution 152 may increase, decrease, or stay the same. In alternative examples, the predicted distributions 152 may have larger ranges, particularly if the engagement of the users differs in the updated observational data 157.

As explained above, samples 154 are selected from the predicted distributions 152 by the action selector 153. In the illustrated embodiment, the first media program 136A has a sample 154 of 8 engagement days, the second media program 136B has a sample 154 of 8 engagement days, and the third media program 136C has a sample of 154 of 11 engagement days. The action selector 153 selects a media program 136 based on the samples 154. In the illustrated embodiment, the action selector 153 selects the third media program 136C because the third media program 136C has the highest sample 154. Because the media programs 136 are selected based on the samples 154, the selected media program 136 may not have the highest mean expected long-term outcome—as shown by the mean value of the distributions 152. This selection process balances exploration—i.e., selecting media content so that more data can be collected related to that media content—and efficiency—i.e., selecting media content that is likely to have a high expected reward, such as a high number of engagement days over the optimization period.

After the third media program 136C is selected, it is transmitted to the computing device 102 and presented to the user U. In an example, the user U may be the fifth user from FIG. 8. As previously discussed, further observational data 157 can continue to be collected as more time passes.

Although FIGS. 4-9 show selecting media content at two points in time, in embodiments, media content is selected repeatedly. In an example, media content is selected every day. In another example, media content is selected multiple times each day. In embodiments, each time media content is selected, and even during times when media content is not being selected, additional observational data is collected with which updated distributions are determined and media content is selected.

The pseudocode of a second algorithm below summarizes the process for repeatedly selecting media programs as more observational data becomes available. The second algorithm takes as input a set (A) of media programs (a) and a number (B) of media programs selected on each day (t) of a number (T) of days. Each media program is associated with a set (D) of observational data including traces (z), which is updated as the second algorithm progresses. A predicted distribution $(p(\hat{r}))$ is determined for each media program using a mean vector ($\mu$) and covariance matrix ($\Sigma$) of a posterior distribution $(p(\underline{z}))$ of a mean trace and a vector of weights (w). A sample mean reward ($\hat{r}$) is taken from each predicted distribution, and a media program is selected. The following is pseudocode of the second algorithm:

```
1)   for t = 1, . . . , T do
2)      for a ∈ A do
3)         update D_a with new observational data
4)         p(z̄_a) ← N(z̄_a | μ_a, Σ_a) via the first algorithm described above
5)         p(r̄_a) ← N(r̄_a | w^T μ_a, w^T Σ_a w)
6)      end for
7)      for i = 1, . . . , B do
8)         for a ∈ A do
```

-continued

```
 9)        Sample mean reward r̂_a ~ p(r̄_a)
10)        end for
11)        Select media program a_{t,j} ← argmax_{a∈A}{r̂_a}
12)     end for
13)  end for
```

Figure 10:
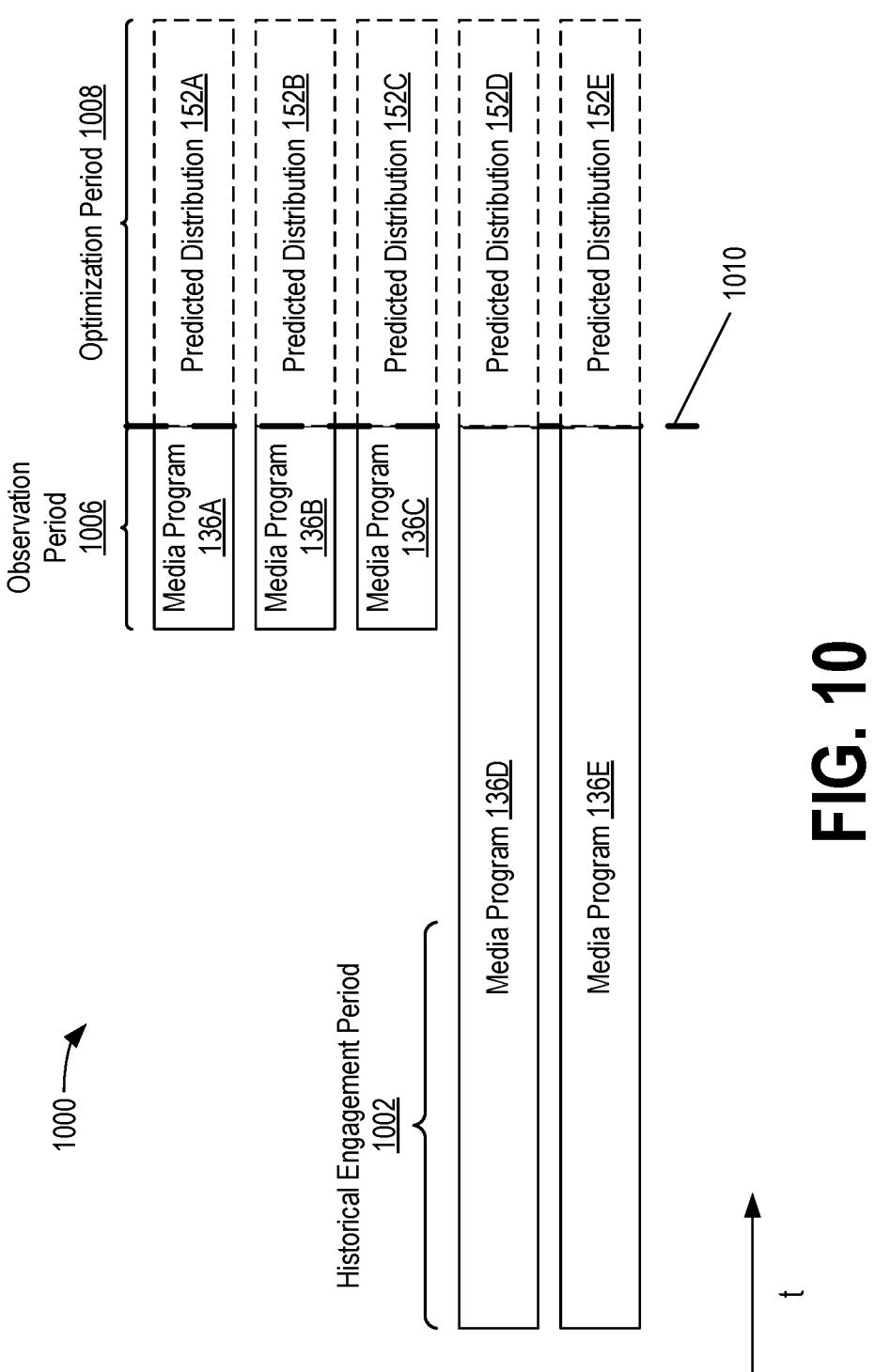
FIG. 10 illustrates an alternative example of a timeline of selecting media content for optimal long-term outcomes.
Figure 11:
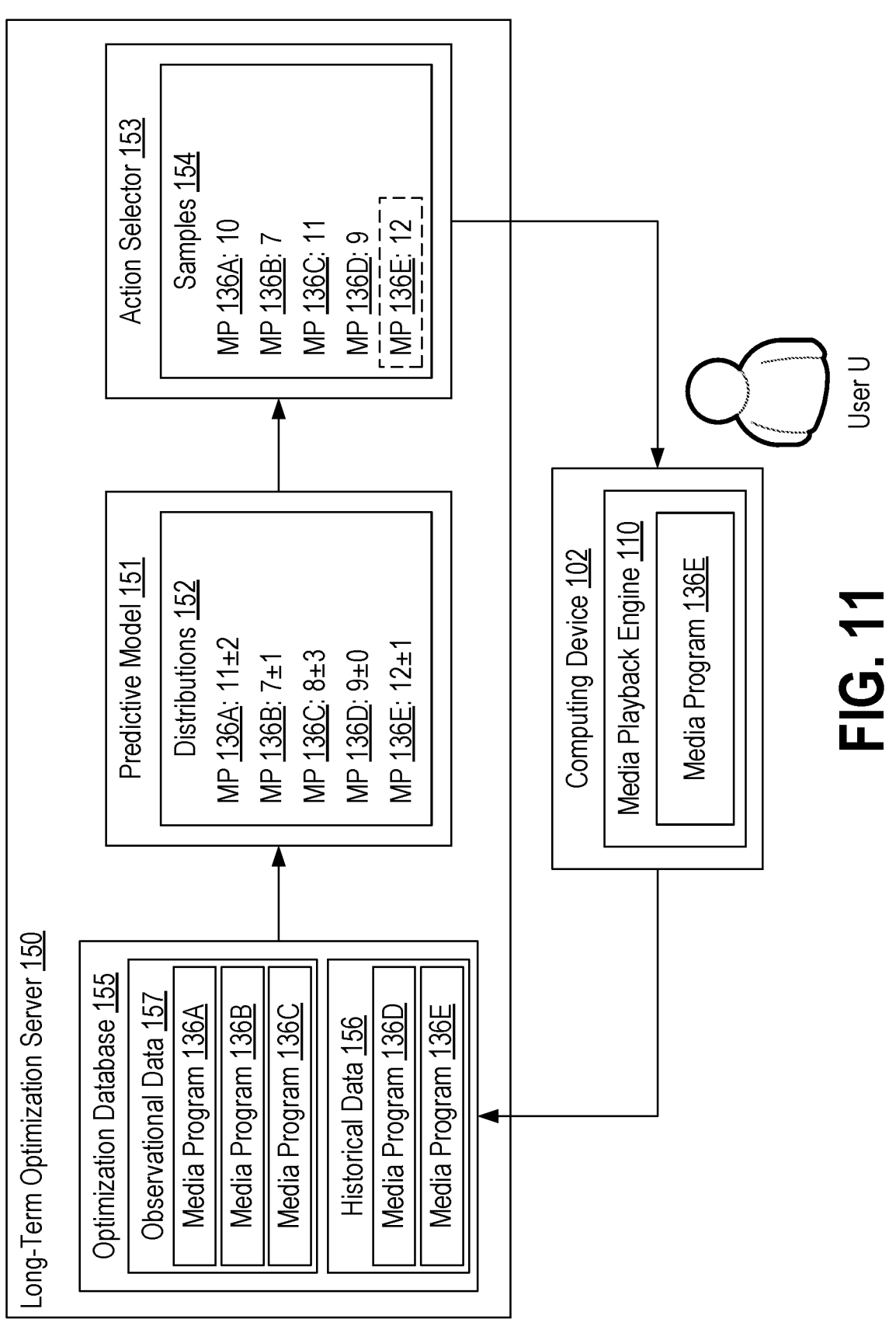
FIG. 11 illustrates an alternative example embodiment of a predictive model and an action selector selecting media content.

Turning to FIGS. 10 and 11, alternative examples of selecting media content for optimal long-term outcomes is shown. In contrast to the previous examples, in the examples illustrated in FIGS. 10-11, the media programs from which the historical data is compiled—the fourth media program 136D and the fifth media program 136E in the illustrated examples—are also considered for selection during the optimization period 1008. In an example, the fourth and fifth media programs 136D-E are media programs that were not recently released, but a user has not engaged with the fourth and fifth media programs 136D-E.

FIG. 10 illustrates an example timeline 1000 in which the fourth and fifth media programs 136D-E are also considered for selection. Because the fourth and fifth media programs 136D-E are considered for selection, predicted distributions 152D-E for an optimization period 1008 are determined for the fourth and fifth media programs 136D-E in addition to the predicted distributions 152A-C for the first, second, and third media programs 136A-C. As described herein, the predicted distributions 152D-E for the fourth and fifth media programs 136D-E may be based on historical data, such as data collected during a historical data 1002.

FIG. 11 illustrates an example of a predictive model 151 and action selector 153 selecting media content. As described above, the predictive model 151 determines predicted distributions 152 for the media programs 136 considered for selection, and the action selector 153 selects samples 154 from the distributions 152 and selects a media program 136 based on the samples 154. The distributions 152 and samples 154 for the first, second, and third media programs 136A-C are determined in the same manner as described above.

Because long-term data for the fourth and fifth media programs 136D-E exists, different methods may be used to estimate long-term outcomes for the fourth and fifth media programs 136D-E than are used to estimate long-term outcomes for the first, second, and third media programs 136A-C. In an example, the long-term outcomes for the fourth and fifth media programs 136D-E are estimated by averaging the number of engagement days for periods of the same length as the optimization period from all available historical data 156 for each of the fourth and fifth media programs 136D-E. For example, if the optimization period is 60 days, the historical data 156 is evaluated to determine a mean and variance for a number of engagement days in a 60-day period for each of the fourth and fifth media programs 136D-E. In another example, a separate predictive model 151 is trained to predict long-term outcomes for media programs 136 for which sufficient data exists from before the optimization period.

Samples 154 can be selected from the distributions 152 for the fourth and fifth media programs 136D-E similarly to how samples are selected for the first, second, and third media programs 136A-C. A media program 136 can be selected based on the samples 154, as described above. In the illustrated example, the fifth media program 136E is selected based on the samples 154.

Figure 12:
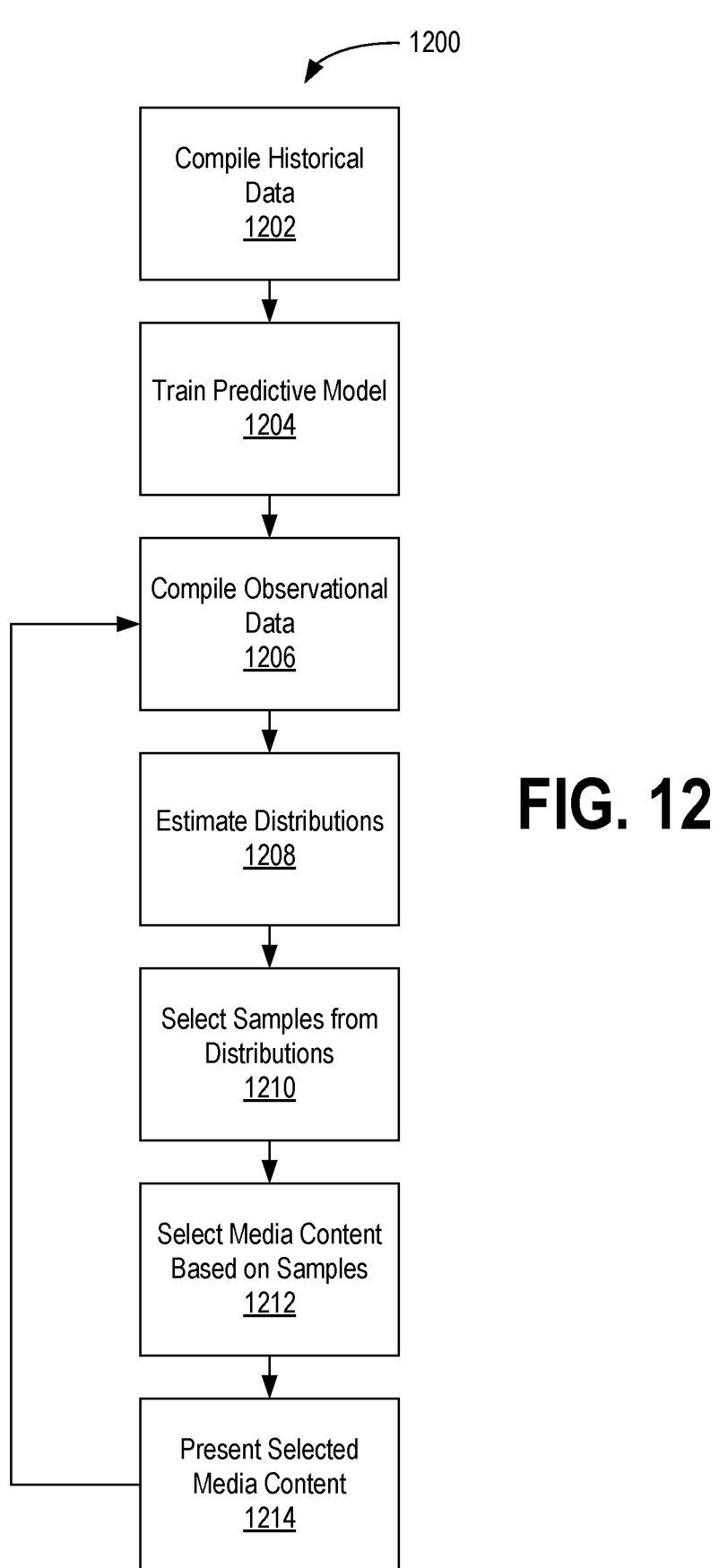
FIG. 12 illustrates a flowchart of an example method for selecting media content for optimal long-term outcomes.

FIG. 12 illustrates a flowchart of an example method 1200 for optimizing selection of media content for long-term outcomes. The method 1200 includes operations 1202, 1204, 1206, 1208, 1210, 1212, 1214.

The operation 1202 is performed to compile historical data. In an embodiment, the historical data is compiled for one or more media programs from one or more historical engagement periods. In an example, the historical data includes engagement data that includes a number of days that one or more users engaged with the media programs during the one or more historical engagement periods. In another example, the engagement data includes interaction data that includes a number of interactions one or more users had with the media programs during the one or more historical engagement periods. In a further example, the engagement data includes listening data that includes an amount of time—e.g., a number of minutes—that one or more users watched/listened to the media programs during the one or more historical engagement periods. In some embodiments, the one or more media programs from which historical data is compiled are chosen based on similarities with other media programs being considered for selection. In an example, the operation 1202 is performed by a long-term optimization server collecting engagement data from one or more computing devices executing a media playback application, and the historical data is stored in an optimization database.

The operation 1204 is performed to train a predictive model using the historical data. In an embodiment, the predictive model is a reward model for which parameters are set using empirical averages calculated using the historical data. In alternative embodiments, multiple predictive models are trained. In an example, the operation 1204 is performed by a long-term optimization server, which trains and maintains the predictive model.

The operation 1206 is performed to compile observational data. In an embodiment, observational data is compiled for one or more media programs that are being considered for selection. The observational data is collected from one or more observation periods. In an example, each media program is associated with an observation period that begins when the media program is released. Like with the historical data collected during the operation 1202, in embodiments, the observational data includes engagement data including a number of engagement days that one or more users engaged with the media programs during the observation period. In another embodiment, the engagement data includes interaction data that includes a number of interactions one or more users had with the media programs during the ongoing optimization period. In a further example, the engagement data includes listening data that includes an amount of time—e.g., a number of minutes—that one or more users watched/listened to the media programs during the ongoing optimization period.

In an example, the operation 1206 is performed by a long-term optimization server collecting engagement data from one or more computing devices executing a media playback application, and the observational data is stored in an optimization database. In some examples, the one or more computing devices from which the observational data is collected are the same one or more computing devices from which the historical data is collected in the operation 1202. In alternative embodiments, the one or more computing devices from which the observational data is collected are different one or more computing devices from which the historical data is collected in the operation 1202.

The operation 1208 is performed to estimate distributions for the one or more media programs that are being considered for selection. In embodiments, the distributions are estimated by predicting intermediate outcomes for each of the one or more media programs being considered for selection during an optimization period. In an example, the estimated distributions have a mean and variance which are estimated as a product of a vector of weights with a mean vector and covariance matrix, as explained in detail above. Examples of the distributions describe an expected number of engagement days for the optimization period. In an example, the distributions are estimated using the predictive model trained in the operation 1204 and the observational data compiled in the operation 1206.

The operation 1210 is performed to select samples from the distributions estimated in the operation 1208. In an embodiment, the samples are selected using Thompson sampling. In alternative embodiments, the samples are selected randomly from the distributions. In an example, the operation 1210 is performed by an action selector.

The operation 1212 is performed to select media content based on the samples selected in the operation 1210. In an embodiment, the media program associated with the highest sample is selected. In alternative embodiments, other criteria are used to select based on the samples. In some embodiments, if multiple samples are tied based on the criterion, a tiebreaker is used to select from among the tied samples. For example, random selection may be used as the tiebreaker. In an example, the operation 1212 is performed by an action selector.

The operation 1214 is performed to present the media content selected in the operation 1212. Examples of presenting the media program include to present a user interface that includes a listing of the selected media program and playing the selected media program or a media content item associated with the media program. In an example, the operation 1214 is performed by a computing device that receives the selected media content from a media delivery system.

After the operation 1214, the method 1200 returns to the operation 1206 and more observational data is compiled. In embodiments, the method 1200 continues to loop through the operations 1206-1114, collecting more observational data with which more accurate distributions are estimated and more media content is selected.

Further aspects of the present disclosure are described in the following numbered clauses.

Clause 1: A method for selecting actions for optimal long-term outcomes, the method comprising: compiling short-term observational data for a first plurality of actions, the short-term observational data including intermediate outcomes from an observation period; compiling historical data for a second plurality of actions, the historical data including intermediate outcomes and long-term outcomes from a historical period; training a reward model using the historical data; estimating, using the reward model and the short-term observational data, distributions for each of the first plurality of actions, each distribution in the distributions defining an estimated range of a long-term outcome for an optimization period; selecting samples from each distribution; and performing an action from the first plurality of actions based on the samples.

Clause 2: The method according to clause 1, further comprising: updating the short-term observational data with additional intermediate outcomes; estimating, using the reward model and the updated short-term observational data, second distributions for each of the first plurality of actions; selecting second samples from each distribution; and selecting a second action from the first plurality of actions based on the samples.

Clause 3: The method according to clause 1, wherein estimating distributions for each of the first plurality of actions includes: predicting intermediate outcomes for each of the first plurality of actions over the optimization period; and determining the estimated range for each distribution using the predicted intermediate outcomes.

Clause 4: The method according to clause 1, wherein training the reward model using the historical data includes: estimating one or more model parameters using empirical averages from the historical data.

Clause 5: The method according to clause 1, wherein performing an action from the first plurality of actions based on the sample includes: selecting a sample with a maximum value from among the samples; and performing an action associated with a distribution from which the sample was taken.

Clause 6: The method according to clause 1, wherein the historical period has a same length as the optimization period.

Clause 7: A method for selecting actions for optimal long-term outcomes, the method comprising: compiling short-term observational data for a first plurality of actions, the short-term observational data including intermediate outcomes from one or more observation periods; compiling historical data for a second plurality of actions, the historical data including intermediate outcomes and long-term outcomes from one or more historical periods; training a reward model using the historical data; estimating, using the reward model and the short-term observational data, distributions for each of the first plurality of actions, each distribution in the distributions defining an estimated range of a long-term outcome for an optimization period; selecting samples from each distribution; and performing an action from the first plurality of actions based on the samples.

Clause 8: The method according to clause 7, further comprising: updating the short-term observational data with additional intermediate outcomes; estimating, using the reward model and the updated short-term observational data, second distributions for each of the first plurality of actions; selecting second samples from each distribution; and selecting a second action from the first plurality of actions based on the samples.

Clause 9: The method according to clause 7, wherein estimating distributions for each of the first plurality of actions includes: predicting intermediate outcomes for each of the first plurality of actions over the optimization period; and determining the estimated range for each distribution using the predicted intermediate outcomes.

Clause 10: The method according to clause 7, wherein training the reward model using the historical data includes: estimating one or more model parameters using empirical averages from the historical data.

Clause 11: The method according to clause 7, wherein performing an action from the first plurality of actions based on the sample includes: selecting a sample with a maximum value from among the samples; and performing an action associated with a distribution from which the sample was taken.

Clause 12: The method according to clause 7, wherein each of the one or more historical periods has a same length as the optimization period.

Clause 13: A system for selecting actions for optimal long-term outcomes, the system comprising: one or more processors; and one or more computer-readable storage devices storing data instructions that, when executed by the one or more processors, cause the system to: compile short-term observational data for a first plurality of actions, the short-term observational data including intermediate outcomes from an observation period; compile historical data for a second plurality of actions, the historical data including intermediate outcomes and long-term outcomes from a historical period; train a reward model using the historical data; estimate, using the reward model and the short-term observational data, distributions for each of the first plurality of actions, each distribution in the distributions defining an estimated range of a long-term outcome for an optimization period; select samples from each distribution; and perform an action from the first plurality of actions based on the samples.

Clause 14: The system according to clause 13, wherein the one or more computer-readable storage devices further store data instructions that, when executed by the one or more processors, cause the system to: update the short-term observational data with additional intermediate outcomes; estimate, using the reward model and the updated short-term observational data, second distributions for each of the first plurality of actions; select second samples from each distribution; and select a second action from the first plurality of actions based on the samples.

Clause 15: The system according to clause 13, wherein to estimate distributions for each of the first plurality of actions includes to: predict intermediate outcomes for each of the first plurality of actions over the optimization period; and determine the estimated range for each distribution using the predicted intermediate outcomes.

Clause 16: The system according to clause 13, wherein to train the reward model using the historical data includes to: estimate one or more model parameters using empirical averages from the historical data.

Clause 17: The system according to clause 13, wherein to perform an action from the first plurality of actions based on the sample includes to: select a sample with a maximum value from among the samples; and perform an action associated with a distribution from which the sample was taken.

Clause 18: The system according to clause 13, wherein the historical period has a same length as the optimization period.

Clause 19: A system for selecting actions for optimal long-term outcomes, the system comprising: one or more processors; and one or more computer-readable storage devices storing data instructions that, when executed by the one or more processors, cause the system to: compile short-term observational data for a first plurality of actions, the short-term observational data including intermediate outcomes from one or more observation periods; compile historical data for a second plurality of actions, the historical data including intermediate outcomes and long-term outcomes from one or more historical periods; train a reward model using the historical data; estimate, using the reward model and the short-term observational data, distributions for each of the first plurality of actions, each distribution in the distributions defining an estimated range of a long-term outcome for an optimization period; select samples from each distribution; and perform an action from the first plurality of actions based on the samples.

Clause 20: The system according to clause 19, wherein the one or more computer-readable storage devices further store data instructions that, when executed by the one or more processors, cause the system to: update the short-term observational data with additional intermediate outcomes; estimate, using the reward model and the updated short-term observational data, second distributions for each of the first plurality of actions; select second samples from each distribution; and select a second action from the first plurality of actions based on the samples.

Clause 21: The system according to clause 19, wherein to estimate distributions for each of the first plurality of actions includes to: predict intermediate outcomes for each of the first plurality of actions over the optimization period; and determine the estimated range for each distribution using the predicted intermediate outcomes.

Clause 22: The system according to clause 19, wherein to train the reward model using the historical data includes to: estimate one or more model parameters using empirical averages from the historical data.

Clause 23: The system according to clause 19, wherein to perform an action from the first plurality of actions based on the sample includes to: select a sample with a maximum value from among the samples; and perform an action associated with a distribution from which the sample was taken.

Clause 24: The system according to clause 19, wherein each of the one or more historical periods has a same length as the optimization period.

Clause 25: A non-transitory computer-readable medium having stored thereon data instruction that, when executed by one or more processors, cause the one or more processors to: compile short-term observational data for a first plurality of actions, the short-term observational data including intermediate outcomes from an observation period; compile historical data for a second plurality of actions, the historical data including intermediate outcomes and long-term outcomes from a historical period; train a reward model using the historical data; estimate, using the reward model and the short-term observational data, distributions for each of the first plurality of actions, each distribution in the distributions defining an estimated range of a long-term outcome for an optimization period; select samples from each distribution; and perform an action from the first plurality of actions based on the samples.

Clause 26: The computer-readable medium according to clause 25, further storing thereon data instructions that, when executed by the one or more processors, cause the one or more processors to: update the short-term observational data with additional intermediate outcomes; estimate, using the reward model and the updated short-term observational data, second distributions for each of the first plurality of actions; select second samples from each distribution; and select a second action from the first plurality of actions based on the samples.

Clause 27: The computer-readable medium according to clause 25, wherein to estimate distributions for each of the first plurality of actions includes to: predict intermediate outcomes for each of the first plurality of actions over the optimization period; and determine the estimated range for each distribution using the predicted intermediate outcomes.

Clause 28: The computer-readable medium according to clause 25, wherein to train the reward model using the historical data includes to: estimate one or more model parameters using empirical averages from the historical data.

Clause 29: The computer readable medium according to clause 25, wherein to perform an action from the first plurality of actions based on the sample includes to: select a sample with a maximum value from among the samples; and perform an action associated with a distribution from which the sample was taken.

Clause 30: The computer-readable medium according to clause 25, wherein the historical period has a same length as the optimization period.

Clause 31: A non-transitory computer-readable medium having stored thereon data instruction that, when executed by one or more processors, cause the one or more processors to: compile short-term observational data for a first plurality of actions, the short-term observational data including intermediate outcomes from one or more observation periods; compile historical data for a second plurality of actions, the historical data including intermediate outcomes and long-term outcomes from one or more historical periods; train a reward model using the historical data; estimate, using the reward model and the short-term observational data, distributions for each of the first plurality of actions, each distribution in the distributions defining an estimated range of a long-term outcome for an optimization period; select samples from each distribution; and perform an action from the first plurality of actions based on the samples.

Clause 32: The computer-readable medium according to clause 31, further storing thereon data instructions that, when executed by the one or more processors, cause the one or more processors to: update the short-term observational data with additional intermediate outcomes; estimate, using the reward model and the updated short-term observational data, second distributions for each of the first plurality of actions; select second samples from each distribution; and select a second action from the first plurality of actions based on the samples.

Clause 33: The computer-readable medium according to clause 31, wherein to estimate distributions for each of the first plurality of actions includes to: predict intermediate outcomes for each of the first plurality of actions over the optimization period; and determine the estimated range for each distribution using the predicted intermediate outcomes.

Clause 34: The computer-readable medium according to clause 31, wherein to train the reward model using the historical data includes to: estimate one or more model parameters using empirical averages from the historical data.

Clause 35: The computer-readable medium according to clause 31, wherein to perform an action from the first plurality of actions based on the sample includes to: select a sample with a maximum value from among the samples; and perform an action associated with a distribution from which the sample was taken.

Clause 36: The computer-readable medium according to clause 31, wherein each of the one or more historical periods has a same length as the optimization period.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A method for selecting media content for optimal long-term outcomes, the method comprising:

compiling observational data for a first plurality of media programs, the observational data including engagement data for each of the first plurality of media programs during an observation period; compiling historical data for a second plurality of media programs, the historical data including engagement data for each of the second plurality of media programs during a historical engagement period;

training a reward model using the historical data; estimating, using the reward model and the observational data, distributions for each of the first plurality of media programs, each distribution in the distributions defining an estimated range of engagement days over an optimization period;

selecting samples from the distributions;

selecting a media program from the first plurality of media programs based on the samples; and causing a computing device to present the selected media program.

2. The method of claim 1, further comprising:

updating the observational data with additional engagement data for each of the first plurality of media programs;

estimating, using the reward model and the updated observational data, second distributions for each of the first plurality of media programs;

selecting second samples from the second distributions;

selecting a second media program from the first plurality of media programs based on the second samples; and causing a second computing device to present the selected second media program.

3. The method of claim 1, wherein estimating distributions for each of the first plurality of media programs includes:

for each day in the optimization period, predicting whether a user engages with each of the first plurality of media programs.

4. The method of claim 1, wherein training the reward model using the historical data includes:

estimating one or more model parameters using empirical averages from the historical data.

5. The method of claim 1, wherein selecting the media program from the first plurality of media programs based on the samples includes:

selecting the media program associated with a sample with a maximum value from among the samples.

6. The method of claim 1, wherein causing the computing device to present the selected media program includes:

causing the computing device to present a user interface including a listing for the selected media program.

7. The method of claim 1, wherein causing the computing device to present the selected media program includes:

causing the computing device to play the selected media program.

8. The method of claim 1, wherein the historical engagement period has a same length as the optimization period.

9. The method of claim 1, wherein at least one media program of the second plurality of media programs has at least one similar characteristic to at least one media program of the first plurality of media programs.

10. A system for selecting media programs for optimal long-term outcomes, the system comprising:

one or more processors; and one or more computer-readable storage devices storing data instructions that, when executed by the one or more processors, cause the system to:

compile observational data for a first plurality of media programs, the observational data including intermediate outcomes for one or more observation periods;

compile historical data for a second plurality of media programs, the historical data including intermediate outcomes and long-term outcomes from one or more historical engagement periods;

train a predictive model using the historical data;

estimate, using the predictive model and the observational data, distributions for each of the first plurality of media programs, each distribution in the distributions defining an estimated range for a long-term outcome at an end of an optimization period;

select samples from the distributions;

select a media program from the first plurality of media programs based on the samples;

cause a computing device to present the selected media program; and update the observational data for the first plurality of media programs with updated intermediate outcomes.

11. The system of claim 10, wherein the one or more computer-readable storage devices further store data instructions that, when executed by the one or more processors, cause the system to:

estimate, using the predictive model and the updated observational data, second distributions for the first plurality of media programs;

select second samples from the second distributions;

select a second media program based on the second samples;

cause a second computing device to present the selected second media program; and update the observational data for the first plurality of media programs with additional updated intermediate outcomes.

12. The system of claim 10, wherein the intermediate outcomes include engagement days.

13. The system of claim 10, wherein the estimated range for the long-term outcome at the end of the optimization period includes an estimated number of engagement days for the optimization period.

14. A non-transitory computer-readable medium having stored thereon data instruction that, when executed by one or more processors, cause the one or more processors to:

compile observational data for a first plurality of media content, the observational data including engagement data for each of the first plurality of media content during an observation period;

compile historical data for a second plurality of media content, the historical data including engagement data for each of the second plurality of media content during a historical engagement period;

train a reward model using the historical data;

estimate, using the reward model and the observational data, distributions for each of the first plurality of media content, each distribution in the distributions defining an estimated range of engagement days for an optimization period;

select samples from the distributions;

select media content from the first plurality of media content based on the samples; and cause a computing device to present the selected media content.

15. The computer-readable medium of claim 14, further storing thereon data instructions that, when executed by the one or more processors, cause the one or more processors to:

update the observational data with additional engagement data for each of the first plurality of media content;

estimate, using the reward model and the updated observational data, second distributions for each of the first plurality of media content;

select second samples from the second distributions;

select second media content from the first plurality of media content based on the second samples; and cause a second computing device to present the selected second media content.

16. The computer-readable medium of claim 14, wherein the first plurality of media content includes media programs.

17. The computer-readable medium of claim 16, wherein the media programs are podcast shows.

18. The computer-readable medium of claim 14, wherein the first plurality of media content includes media content items.

19. The computer-readable medium of claim 18, wherein the media content items are audio tracks.

20. The computer-readable medium of claim 14, wherein the engagement data for each of the first plurality of media content includes a number of engagement days during the observation period.

* * * * *